US012072662B2

(12) United States Patent
Mine et al.

(10) Patent No.: US 12,072,662 B2
(45) Date of Patent: Aug. 27, 2024

(54) IMAGE FORMING APPARATUS

(71) Applicant: CANON KABUSHIKI KAISHA, Tokyo (JP)

(72) Inventors: Tsukasa Mine, Ibaraki (JP); Toshiaki Ohata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/227,431

(22) Filed: Apr. 12, 2021

(65) Prior Publication Data

US 2021/0325819 A1 Oct. 21, 2021

(30) Foreign Application Priority Data

Apr. 15, 2020 (JP) ................................ 2020-073186
Mar. 17, 2021 (JP) ................................ 2021-044184

(51) Int. Cl.
*G03G 21/12* (2006.01)
*G03G 15/00* (2006.01)

(52) U.S. Cl.
CPC ......... *G03G 21/12* (2013.01); *G03G 15/5016* (2013.01); *G03G 15/6558* (2013.01)

(58) Field of Classification Search
CPC . G03G 21/12; G03G 15/5016; G03G 15/6558
See application file for complete search history.

(56) References Cited

U.S. PATENT DOCUMENTS 8,126,340 B2 2/2012 Bito et al.
2006/0018671 A1* 1/2006 Kamimura ......... G03G 21/1896 399/13
2010/0080579 A1* 4/2010 Yamaguchi ............ G03G 21/12 399/358
2018/0181042 A1 6/2018 Ooba
2018/0295314 A1* 10/2018 Sugihara ................ H04N 23/69

FOREIGN PATENT DOCUMENTS

JP 2000-221803 A 8/2000
JP 2008-083102 A 4/2008
JP 2018-109833 A 7/2018

OTHER PUBLICATIONS

Hirotoshi Tajima, et al., U.S. Appl. No. 17/227,428, filed Apr. 12, 2021, Art Unit 2852.

* cited by examiner

*Primary Examiner* — Stephanie E Bloss
*Assistant Examiner* — Michael A Harrison
(74) *Attorney, Agent, or Firm* — VENABLE LLP

(57) ABSTRACT

An image forming apparatus includes a first seal, on which a first discrimination mark is displayed, provided at a position corresponding to a first mounting portion for mounting a first collecting container for collecting residual toner, and a second seal, on which a second discrimination mark is displayed, provided at a position corresponding to a second mounting portion for mounting a second collecting container for collecting residual toner. A notifying device notifies, in a case that one of the first collecting container and the second collecting container becomes full, information prompting exchange of the collecting container which becomes full and identifying the collecting container to be exchanged by indicating the first discrimination mark or the second discrimination mark.

8 Claims, 22 Drawing Sheets

IMAGE FORMING APPARATUS

FIELD OF THE INVENTION AND RELATED ART

The present invention relates to an image forming apparatus including a developer collecting device.

Conventionally, for example, in the image forming apparatus of the electrophotographic type, such as the copying machine, by an electrophotographic image forming process, a toner image formed on a photosensitive member as an image bearing member with a developer containing toner is transferred onto a transfer-receiving member such as a recording material. Toner (transfer residual toner) remaining on the photosensitive member during transfer of a toner image from the photosensitive member onto the transfer-receiving member is removed from the surface of the photosensitive member by a cleaning means and is fed as a collected developer to a developer collecting container (collected developer container) by a developer collecting device, so that the collected developer is accumulated inside the developer collecting container. Then, the developer collecting container is exchanged to a blank developer collecting container in the case where the inside of the developer collecting container becomes full with the collected developer or in the like case. Conventionally, in general, when the developer collecting container is exchanged, there is a need to stop an image forming operation of the image forming apparatus in order to stop feeding of the collected developer by the developer collecting device. For that reason, for example, in a business operation in which continuous printing in a large volume is desired, there is a problem such that productivity lowers due to the exchange of the developer collecting container.

In order to solve this problem, a constitution in which two developer collecting containers are provided so as to be mountable in and dismountable from an apparatus main assembly of the image forming apparatus and in which a collected developer is selectively discharged from either one of two discharging portions for discharging the two collecting containers, respectively, has been disclosed (Japanese Laid-Open Patent Application (JP-A) 2008-83102). In the constitution disclosed in JP-A 2008-83102, in a stirring tank in which the collected developer is sent, a stirring member radially provided with a plurality of blades on a rotation shaft is disposed and a plurality of chambers for accommodating the collected developer are formed and defined by the plurality of blades. Then, the stirring member is rotated so that the plurality of chambers of the stirring tank successively pass through two openings provided in the stirring tank so as to communicate with the two discharging portions, respectively, so that the collected developer is discharged from the stirring tank. In the case where the collected developer is discharged from a right side-discharging portion of the two discharging portions disposed side by side with respect to a left-right direction, the feeding member rotates clockwise, and in the case where the collected developer is discharged from a left side-discharging portion of the two discharging portions, the feeding member rotates counterclockwise. According to this constitution, when one of the two developer collecting containers is exchanged, if the other developer collecting container is capable of collecting the collected developer, the one of the two developer collecting containers can be exchanged without stopping an image forming operation.

Here, in the case where one of the developer collecting containers becomes full during the image forming operation, it would be considered that a user is notified of that the developer collecting container becomes full and is prompted to exchange the developer collecting container. However, in the case where the plurality of developer collecting container are used, it would be considered that the developer collecting container which is currently in use and which should not be exchanged is erroneously dismounted.

Incidentally, in the above, the collected developer was described as the transfer residual toner removed from the photosensitive member, but the collected developer generating in the image forming apparatus is not limited thereto. For example, the collected developer may also transfer residual toner removed from an intermediary transfer member which feeds a toner image, primary-transferred from the photosensitive member as a first image bearing member, to a recording material for secondary transfer and which is used as a secondary image bearing member. Further, for example, the collected developer may also be a developer (which may contain toner and a carrier) or the like discharged from a developing provided for developing an electrostatic image formed on the image bearing member.

SUMMARY OF THE INVENTION

A principal object of the present invention is to provide an image forming apparatus which has a constitution including a plurality of collecting containers and being advantageous in terms of simplification of a structure of the image forming apparatus and which is capable of properly recognizing a position of a collecting container to be exchanged.

According to an aspect of the present invention, there is provided an image forming apparatus comprising: an image forming portion configured to form a toner image; a first collecting container provided detachably mountable to a first mounting portion and configured to collect residual toner discharged from the image forming portion; a second collecting container provided detachably mountable to a second mounting portion and configured to collect the residual toner discharged from the image forming portion; a feeding device configured to feed the toner, discharged from the image forming portion, to the first collecting container and the second collecting container; a controller configured to control the feeding device, wherein in a case that the first collecting container becomes full when the feeding device feeds the toner to the first collecting container during image formation, the controller is constituted so as to control the feeding device so that a feeding destination of the toner is switched from the first collecting container to the second collecting container and is constituted so as to control the image forming portion so that an image forming operation is continued; a notifying device configured to notify, in a case that one of the first collecting container and the second collecting container becomes full, information prompting exchange of the collecting container which becomes full; a first mark provided at a position corresponding to the first mounting portion and configured to identify first discrimination information for discriminating the first collecting container notified by the notifying device; and a second mark provided at a position corresponding to the second mounting portion and configured to identify second discrimination information for discriminating the second collecting container notified by the notifying device.

Further features of the present invention will become apparent from the following description of exemplary embodiments with reference to the attached drawings.

Figure 3:
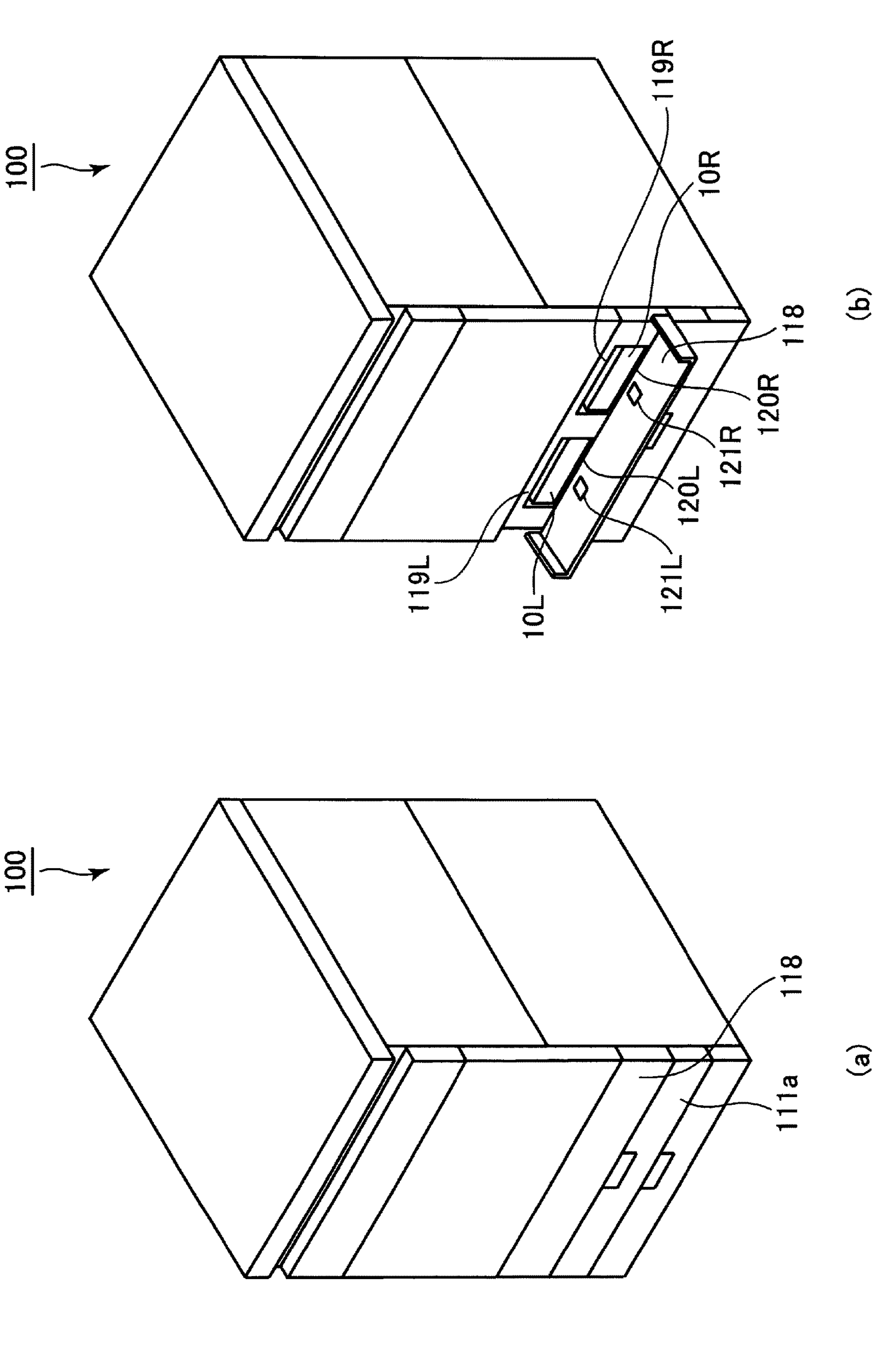

Parts (a) and (b) of FIG. 3 are schematic perspective views of the image forming apparatus for illustrating a mounting mode of a developer collecting container.

Figure 4:
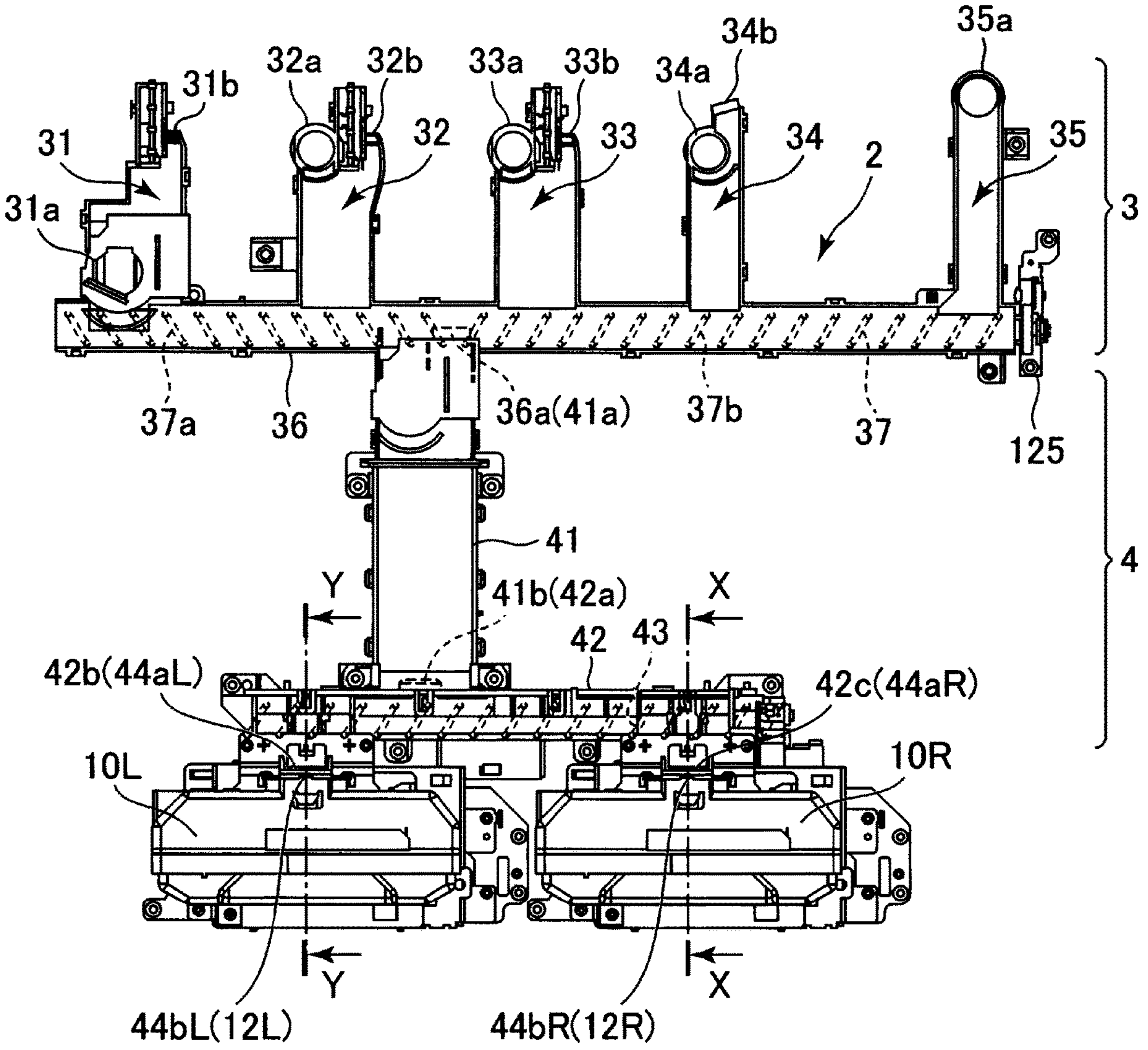

FIG. 4 is a front view of a developer collecting device.

Figure 5:
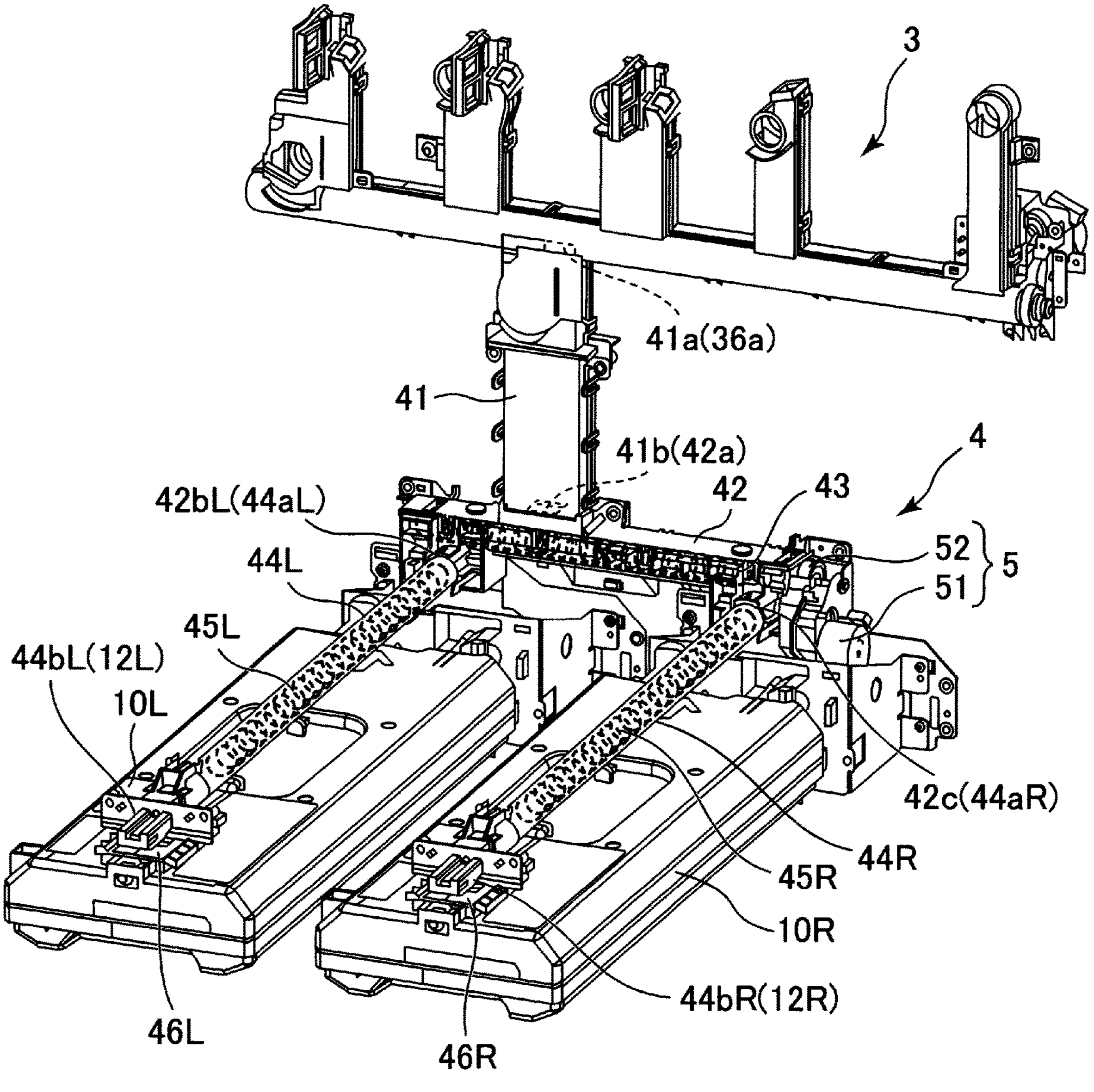

FIG. 5 is a perspective view of the developer collecting device.

Figure 6:
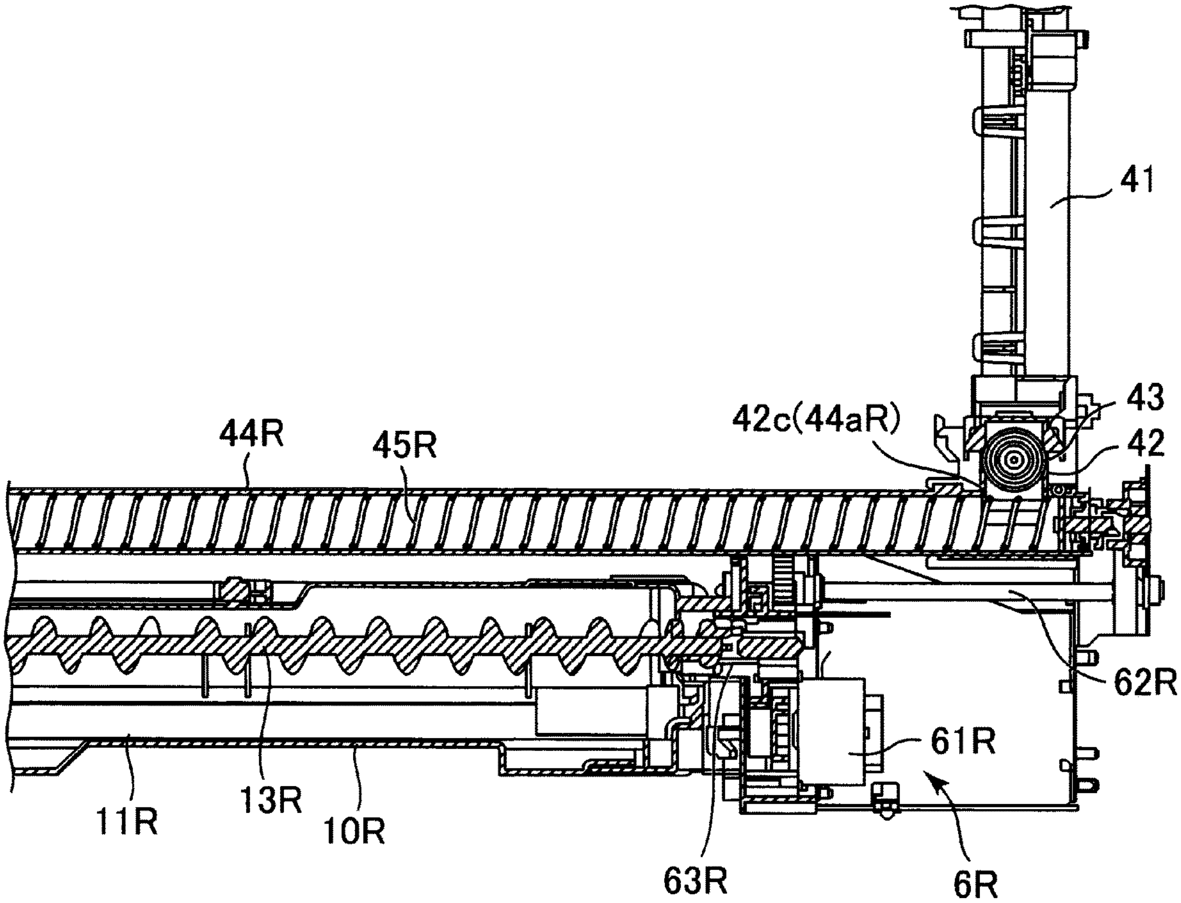

FIG. 6 is a sectional view taken along the X-X line of FIG. 4.

Figure 7:
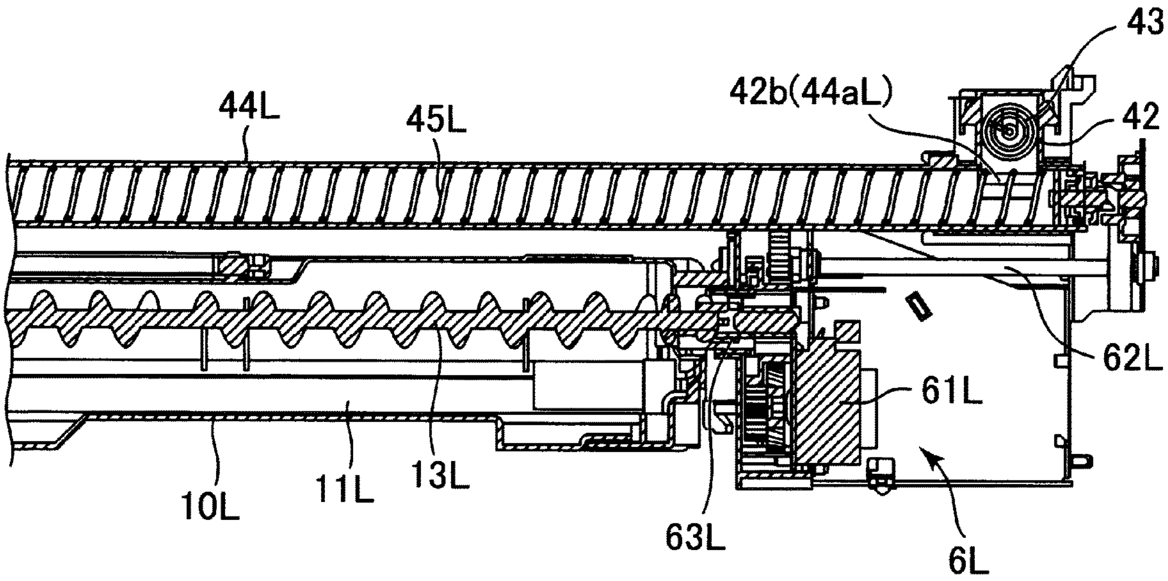

FIG. 7 is a sectional view taken along Y-Y line of FIG. 4.

Figure 8:
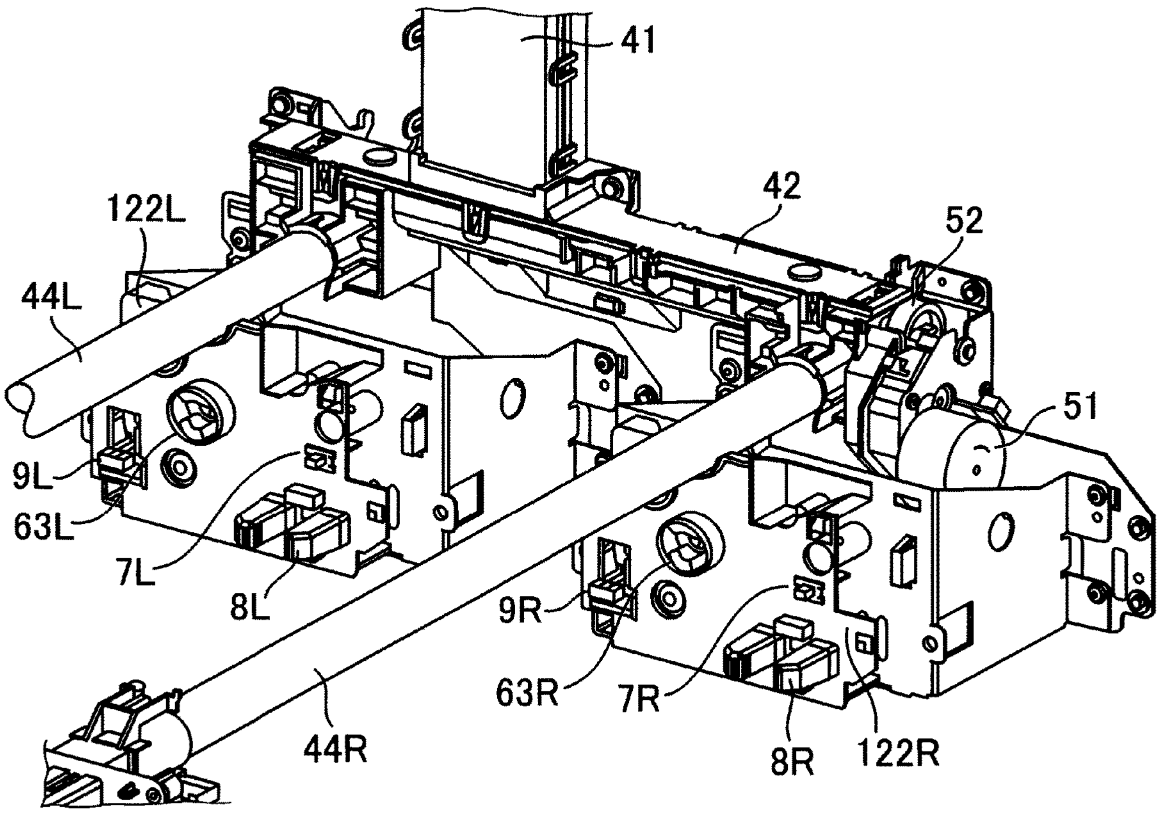

FIG. 8 is a perspective view of a part of the developer collecting device in a state in which the developer collecting container is dismounted.

Figure 9:
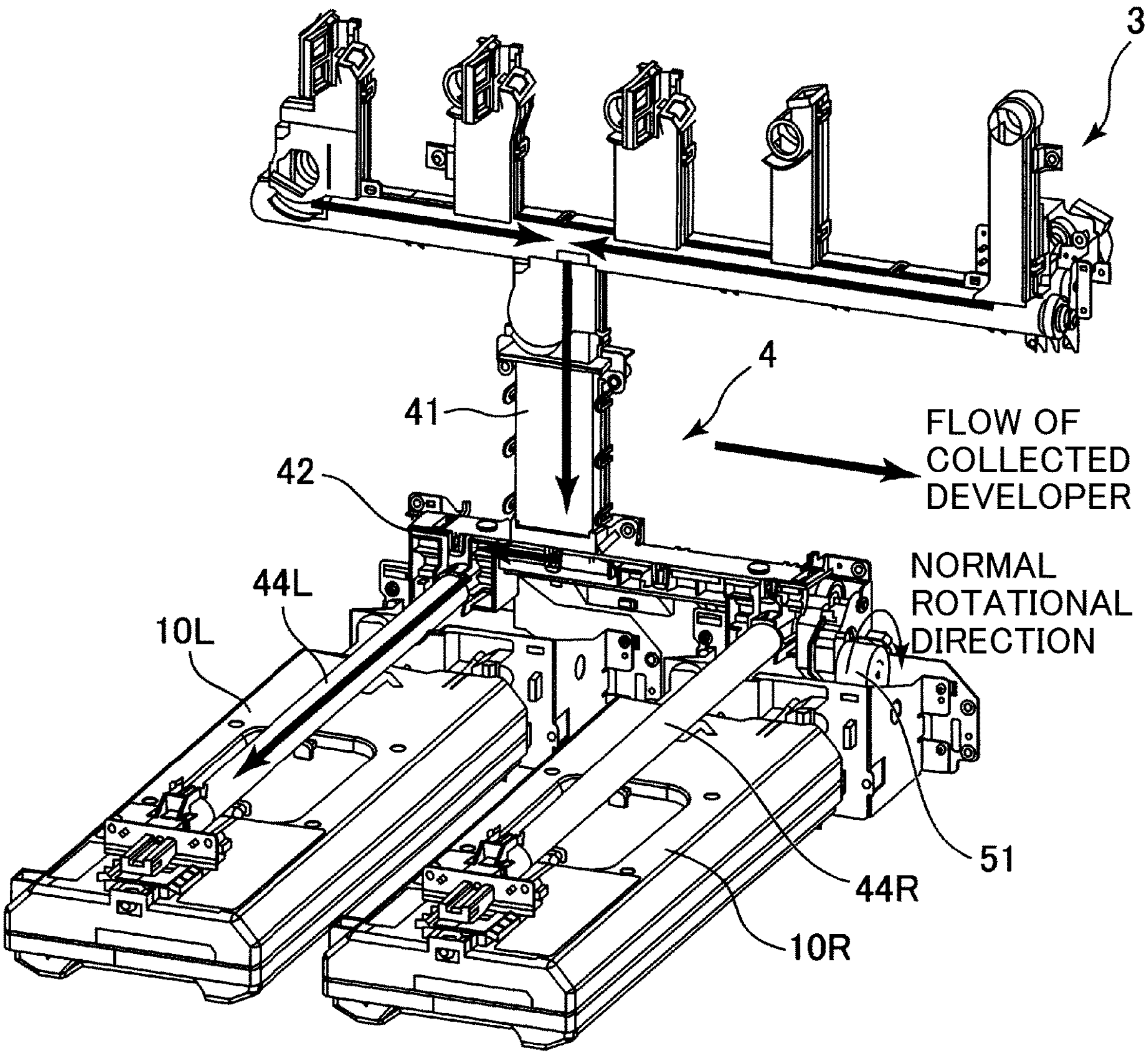

FIG. 9 is a perspective view of the developer collecting device for illustrating a developer collecting operation.

Figure 10:
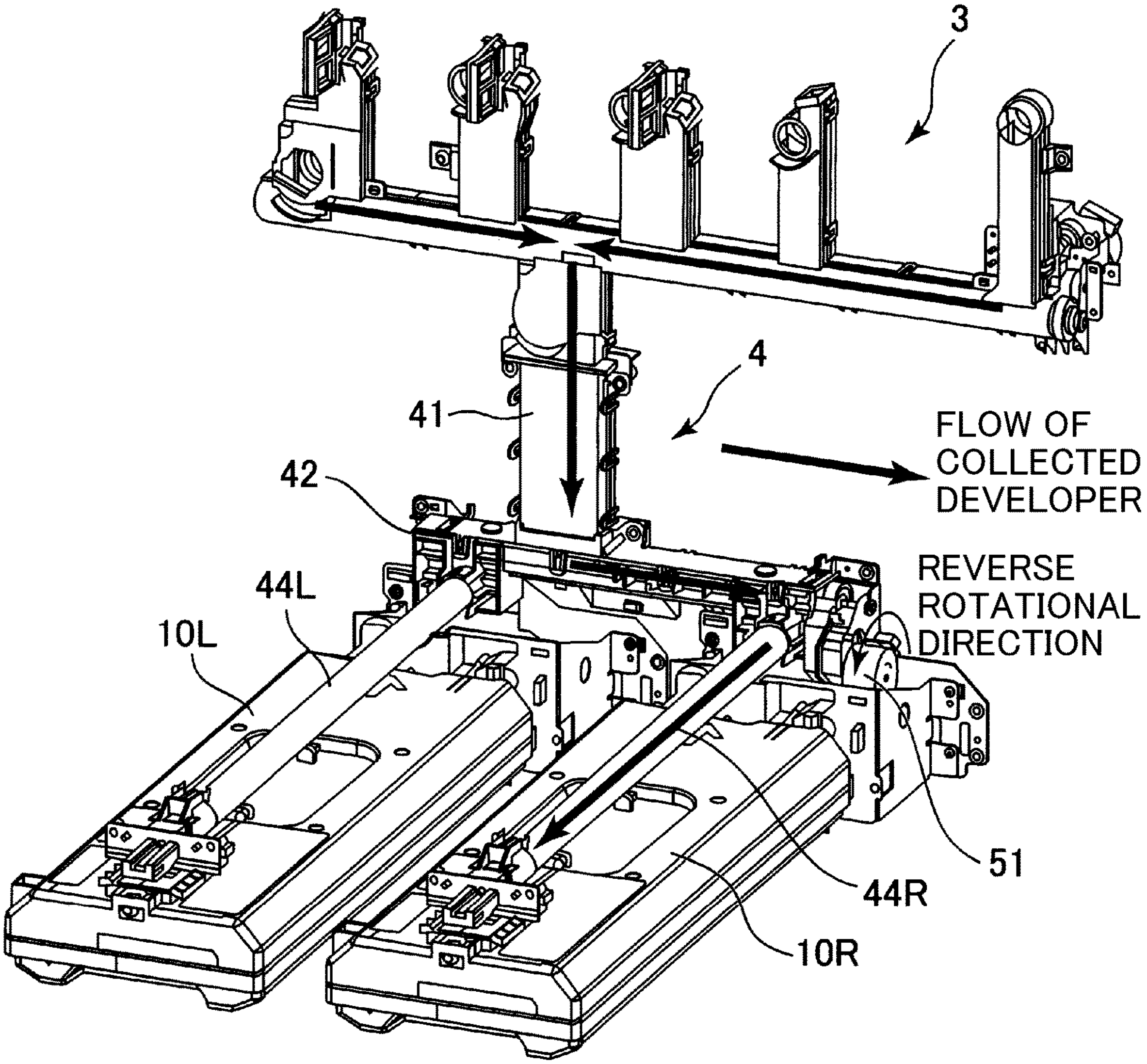

FIG. 10 is a perspective view of the developer collecting device for illustrating the developer collecting operation.

Figure 11:
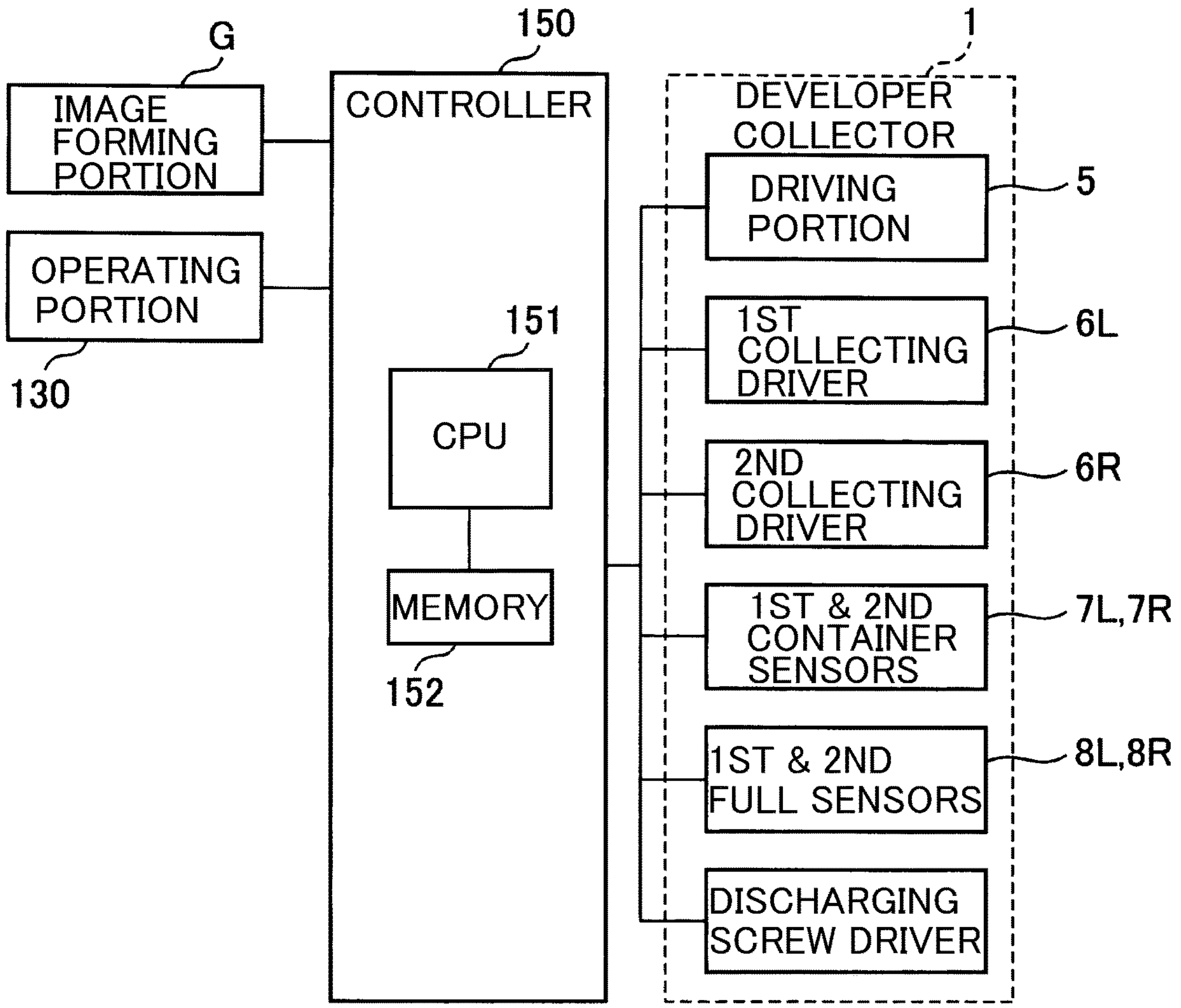

FIG. 11 is a block diagram showing a control mode of a developer collecting device.

Figure 12:
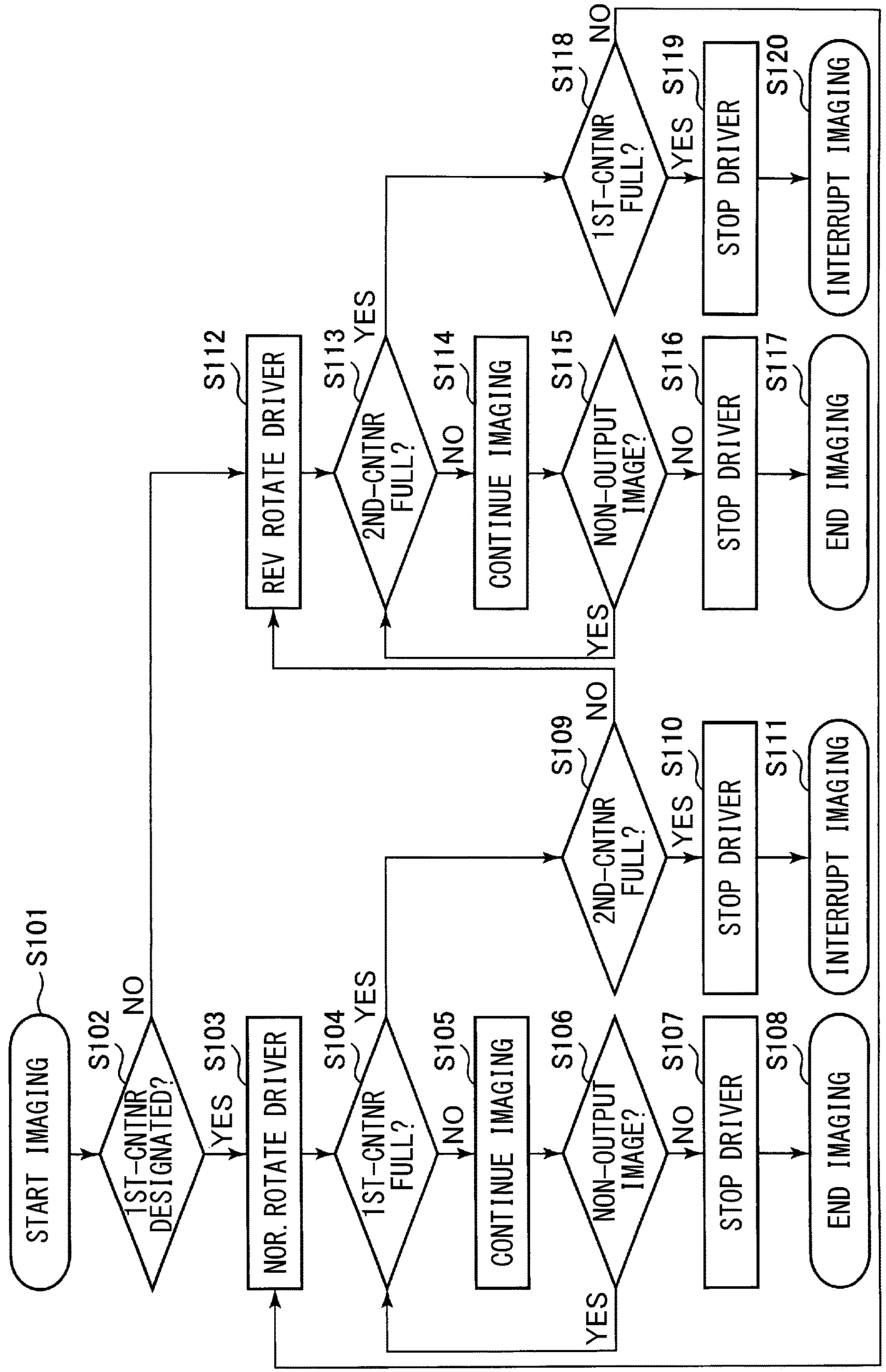

FIG. 12 is a flowchart of a developer collecting operation.

Figure 13:
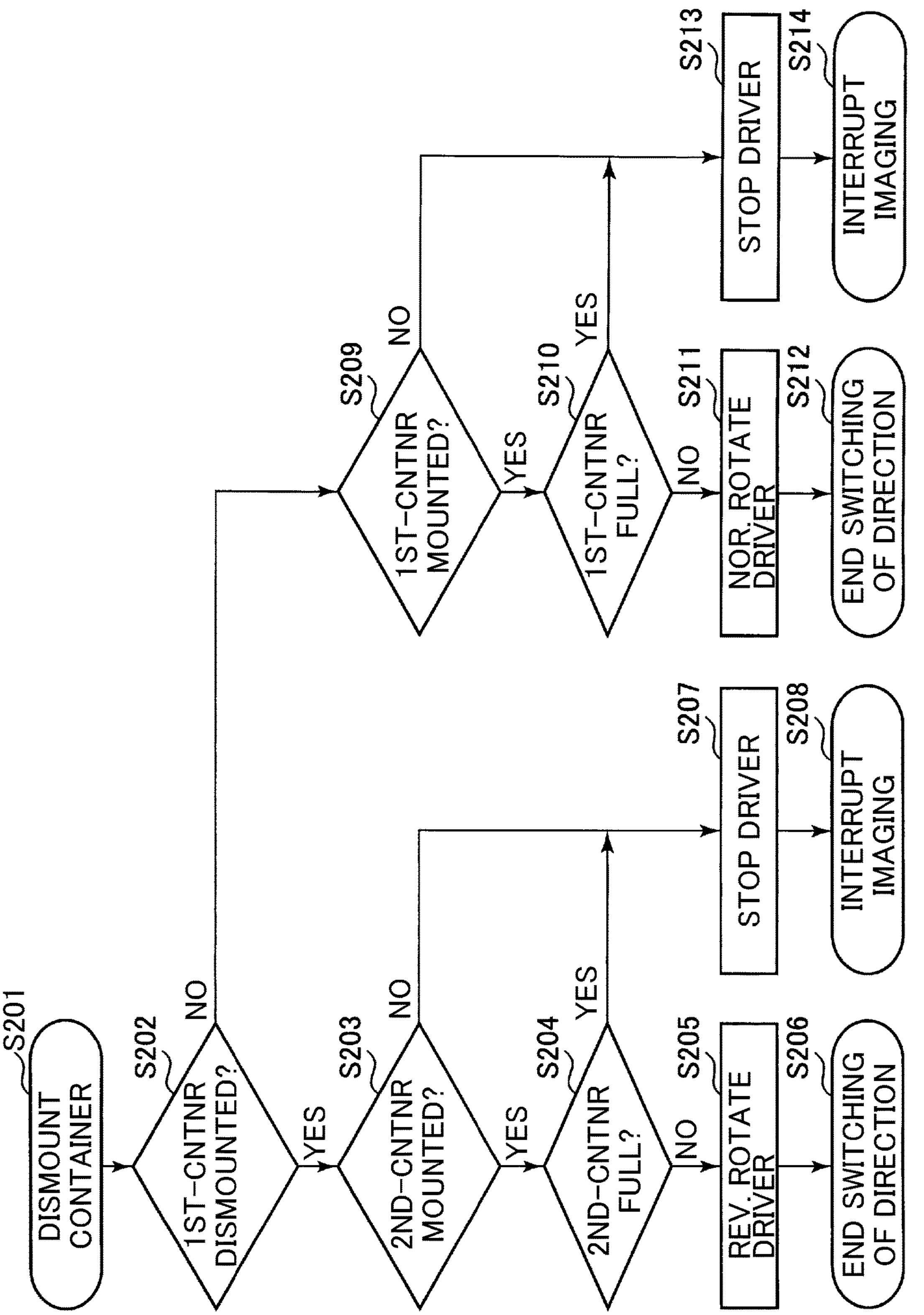

FIG. 13 is a flowchart of an operation in the case where the developer collecting container is dismounted.

Figure 14:
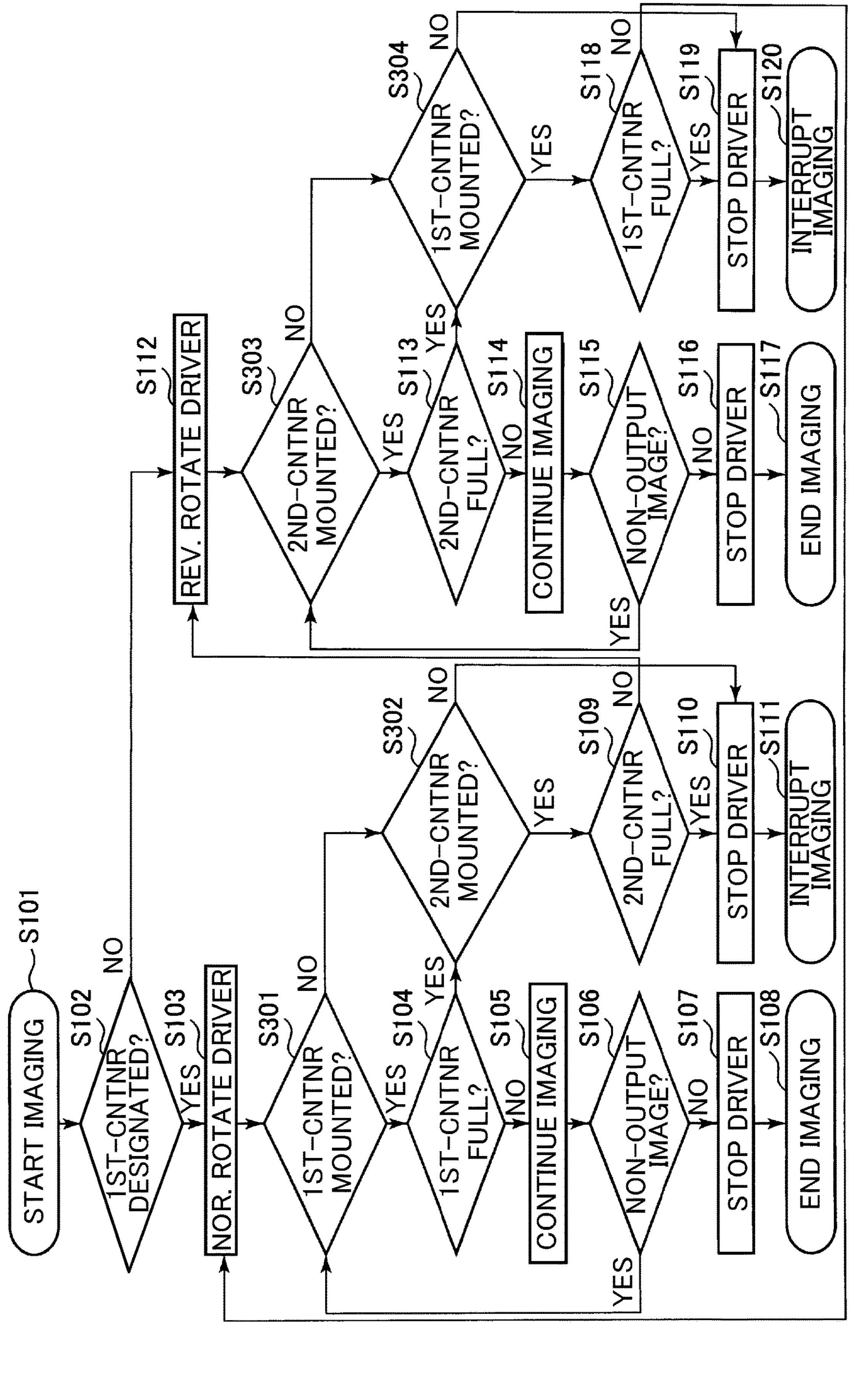

FIG. 14 is a flowchart showing an operation sequence of a developer collecting operation.

Figure 15:
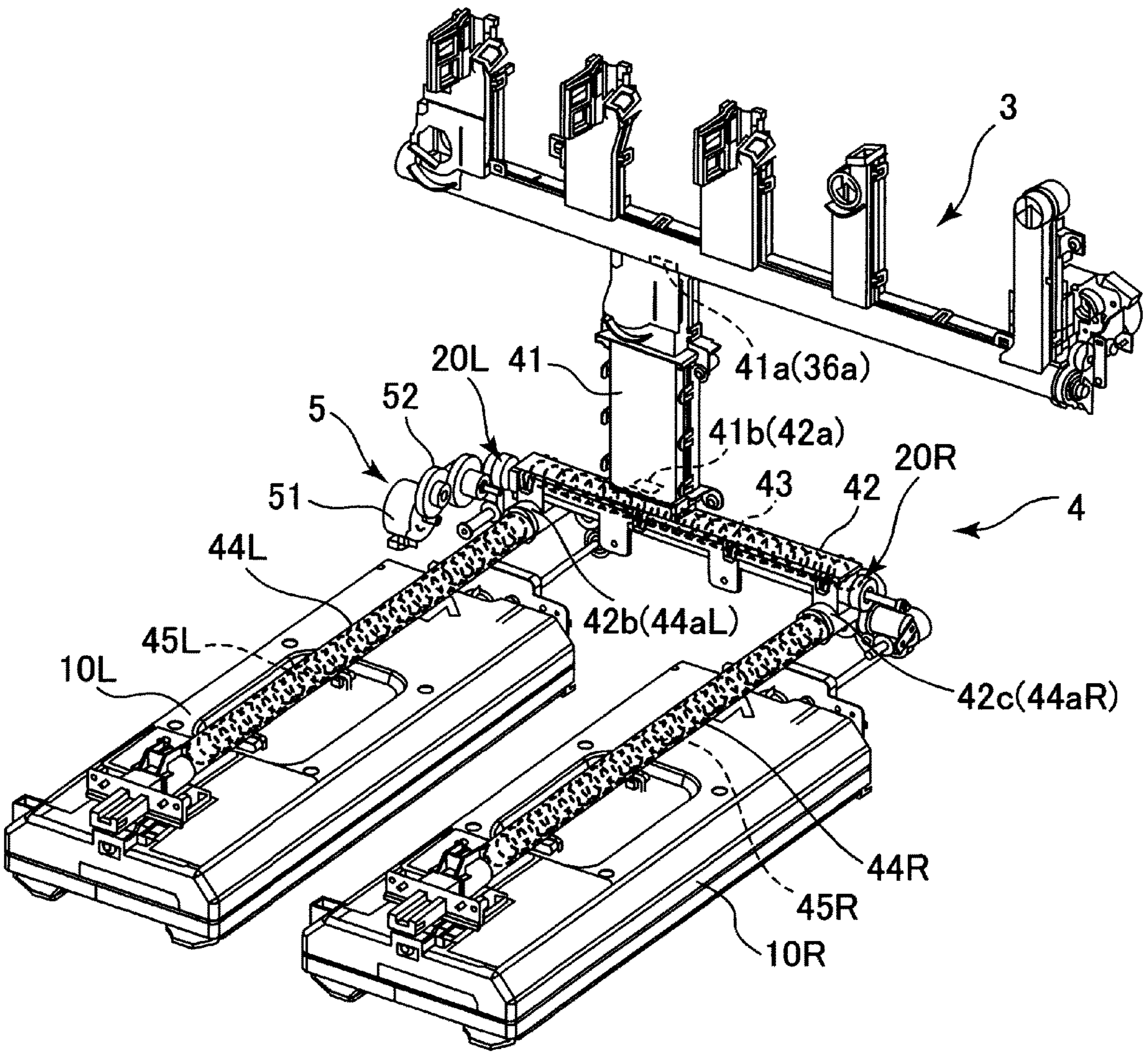

FIG. 15 is a perspective view of a developer collecting device in another embodiment.

Figure 16:
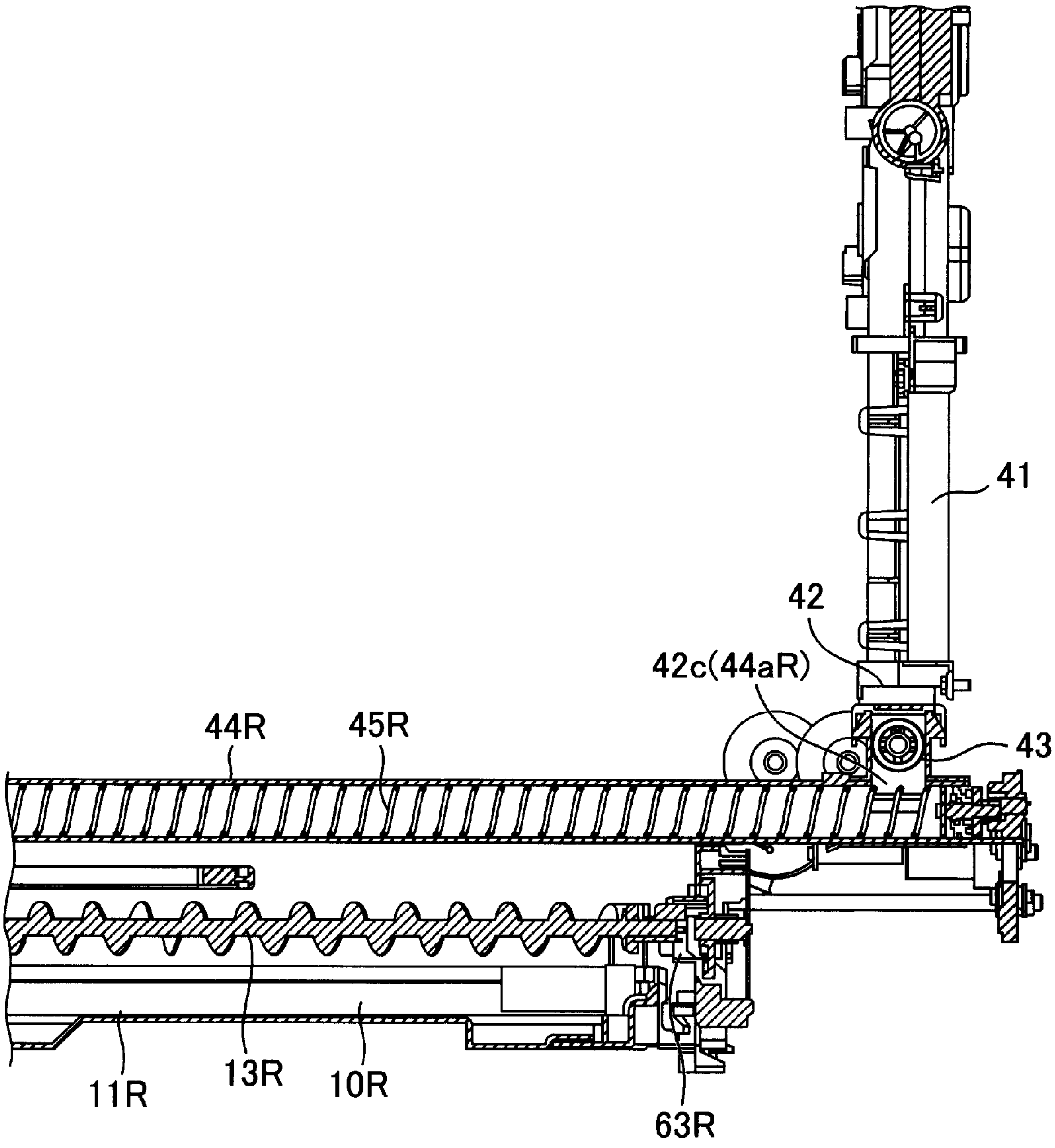

FIG. 16 is a sectional view of the developer collecting device of FIG. 15 similarly taken along the X-X line of FIG. 4.

Figure 17:
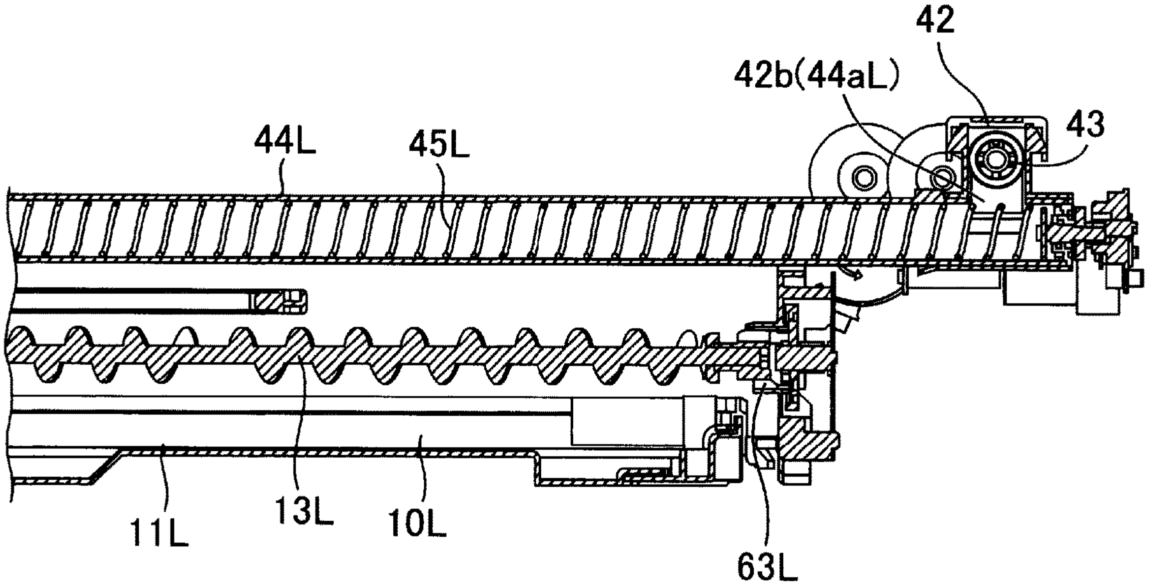

FIG. 17 is a sectional view of the developer collecting device of FIG. 15 similarly taken along the Y-Y line of FIG. 4.

Figure 18:
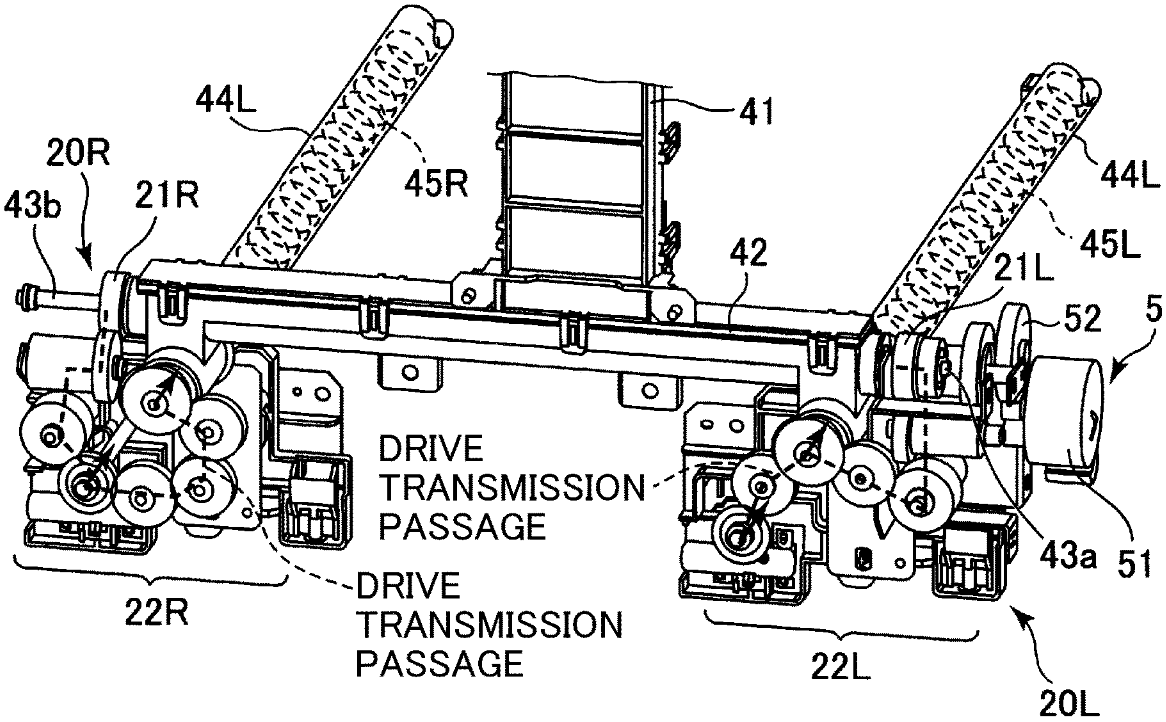

FIG. 18 is a perspective view showing a drive transmission portion of the developer collecting device of FIG. 15.

Figure 19:
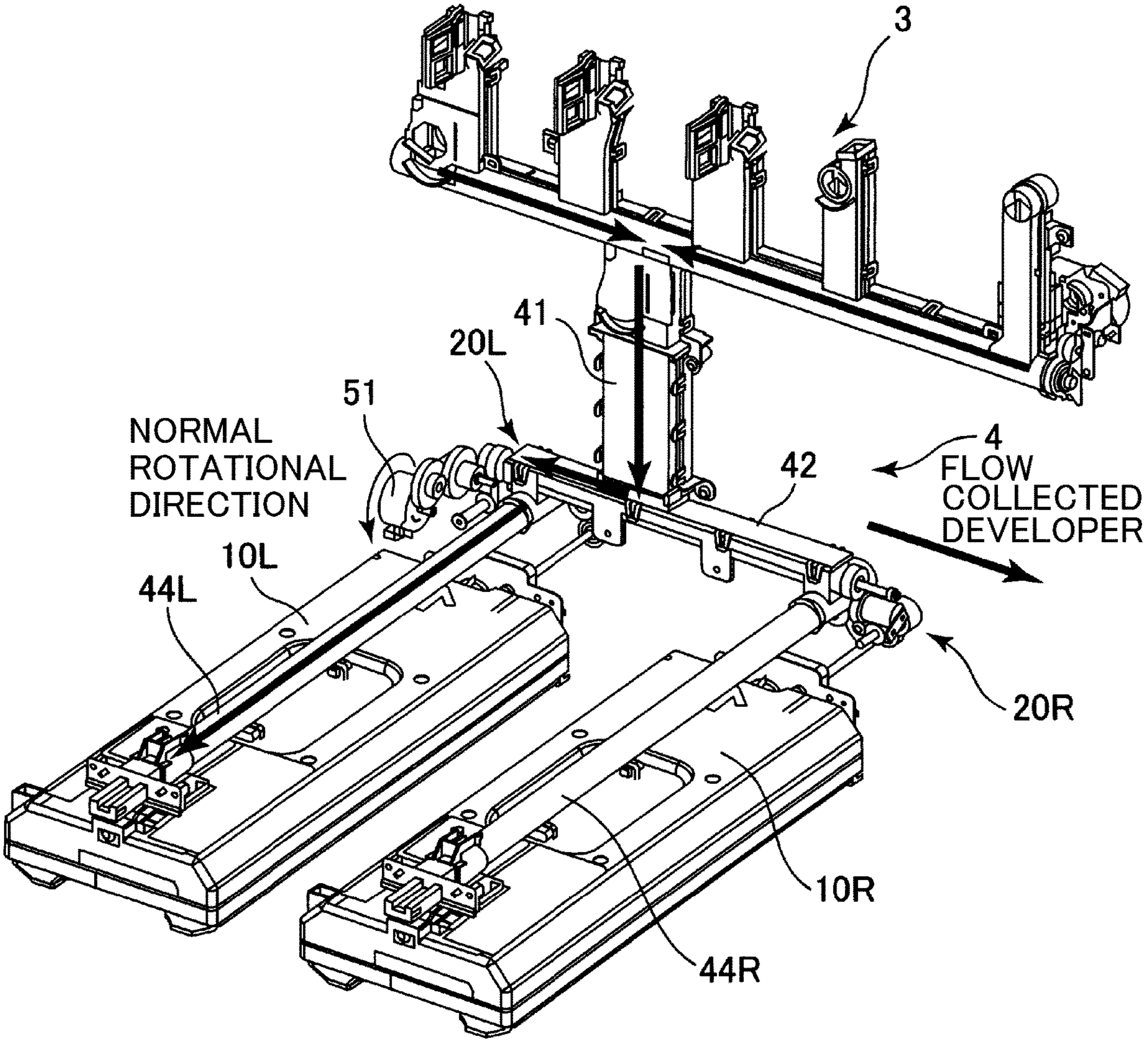

FIG. 19 is a perspective view for illustrating a developer collecting operation in the developer collecting device of FIG. 15.

Figure 20:
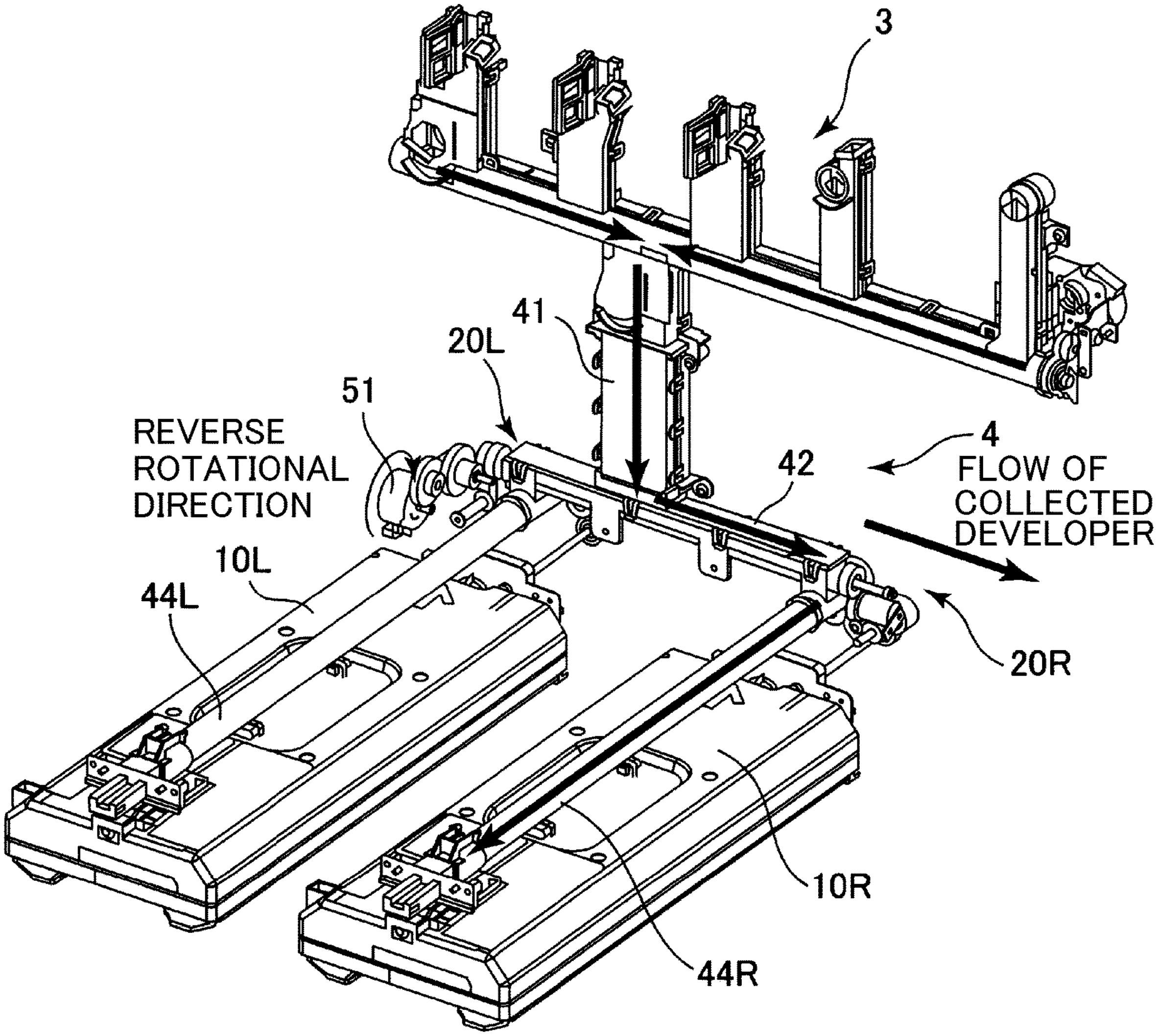

FIG. 20 is a perspective view for illustrating the developer collecting connect in the developer collecting device of FIG. 15.

Figure 21:
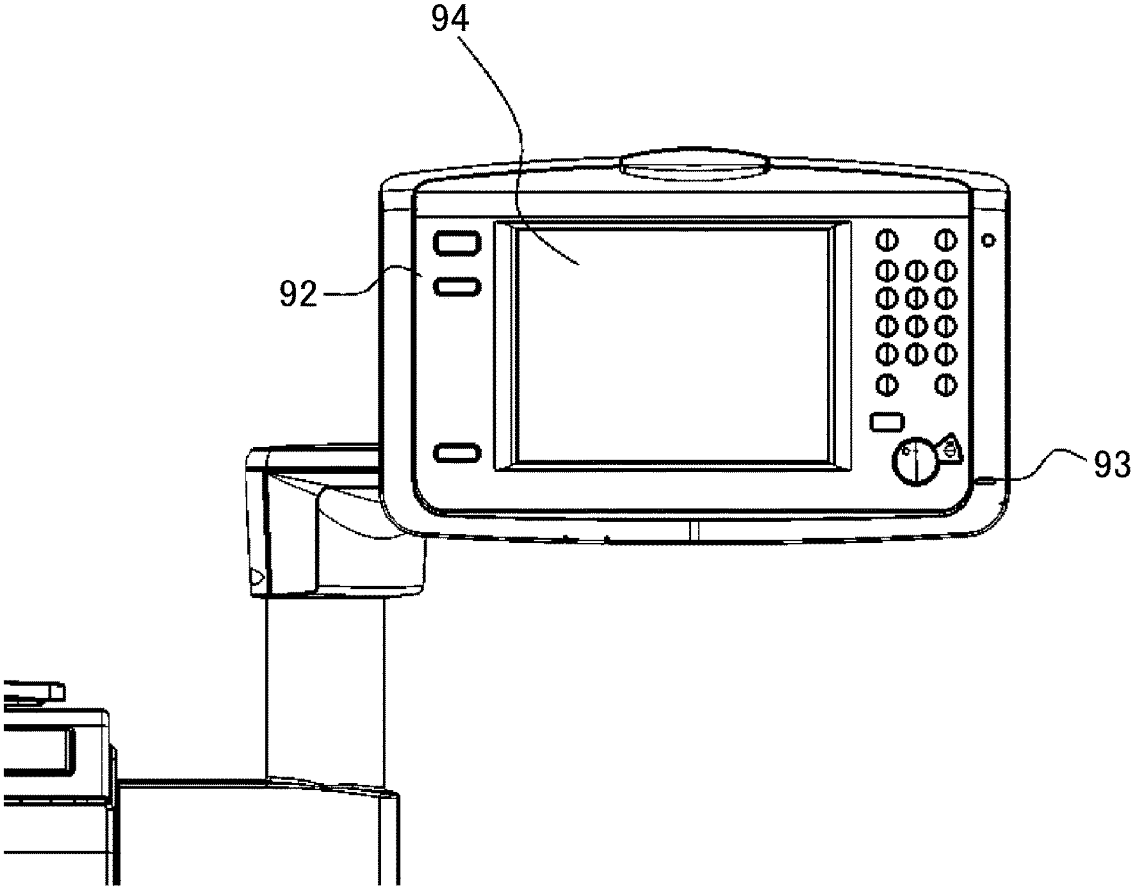

FIG. 21 is a front view of an operating portion of an image forming apparatus.

Figure 22:
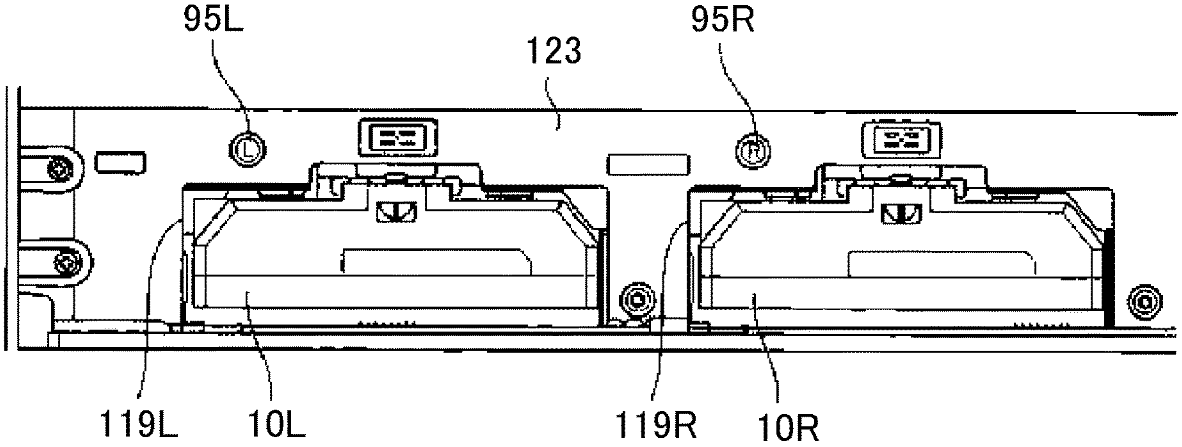

FIG. 22 is a schematic view showing a container mounting portion of the image forming apparatus and a peripheral portion thereof.

Figure 23:
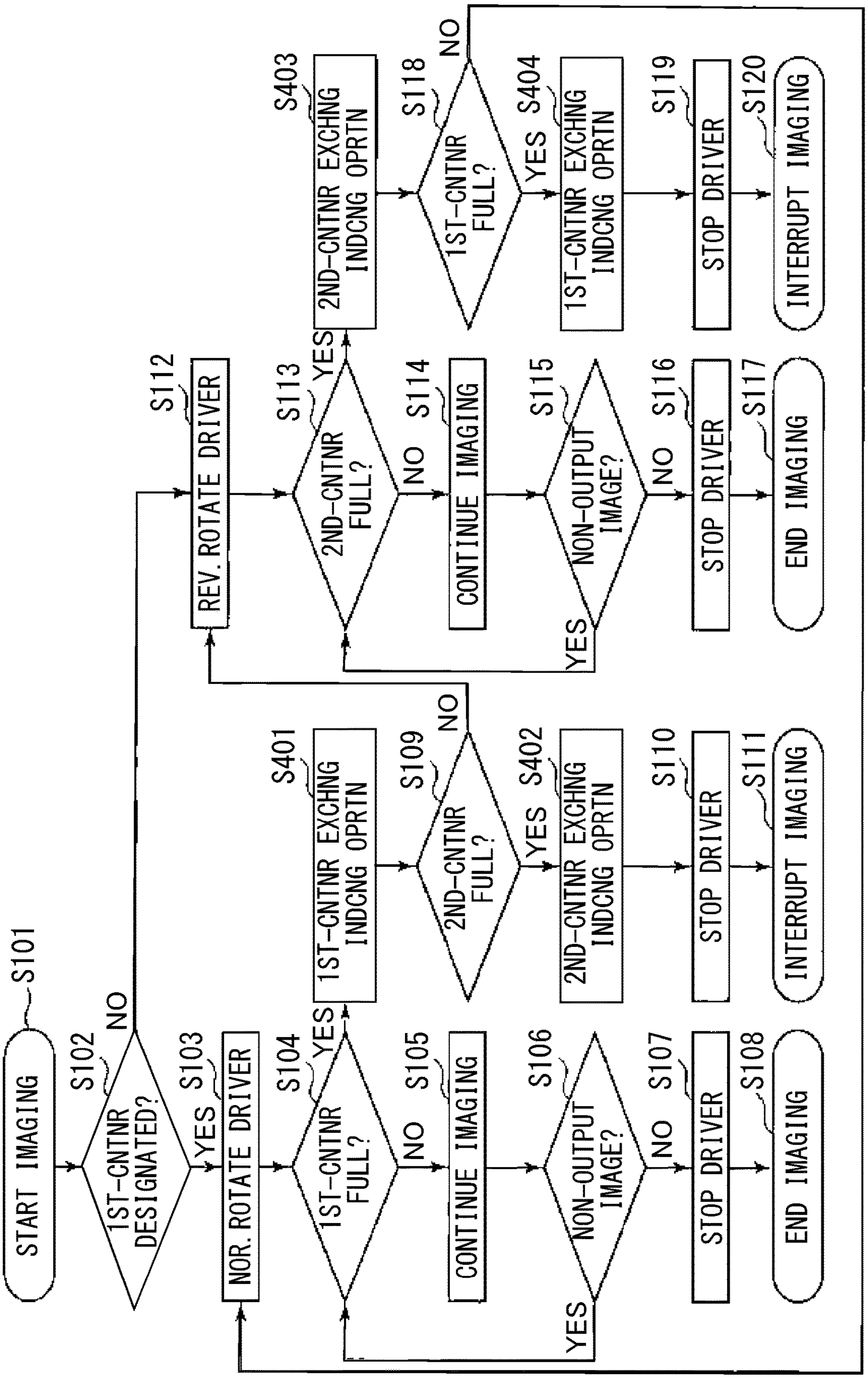

FIG. 23 is a flowchart of an operation of the developer collecting device including a notification operation inducing exchange of a developer collecting container.

Figure 24:
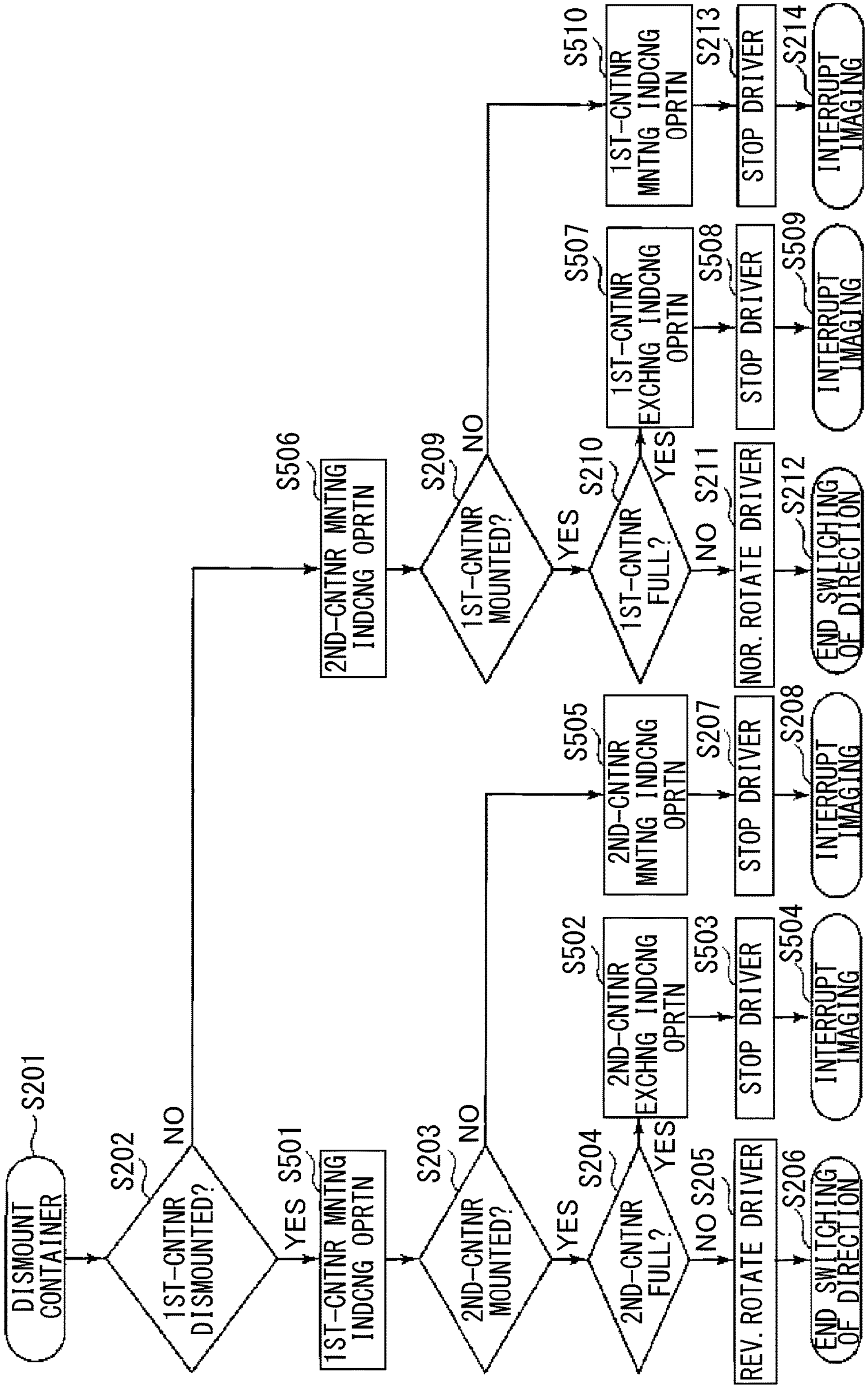

FIG. 24 is a flowchart of an operation of the developer collecting device including a notification operation inducing mounting and exchange of the developer collecting container.

Figure 25:
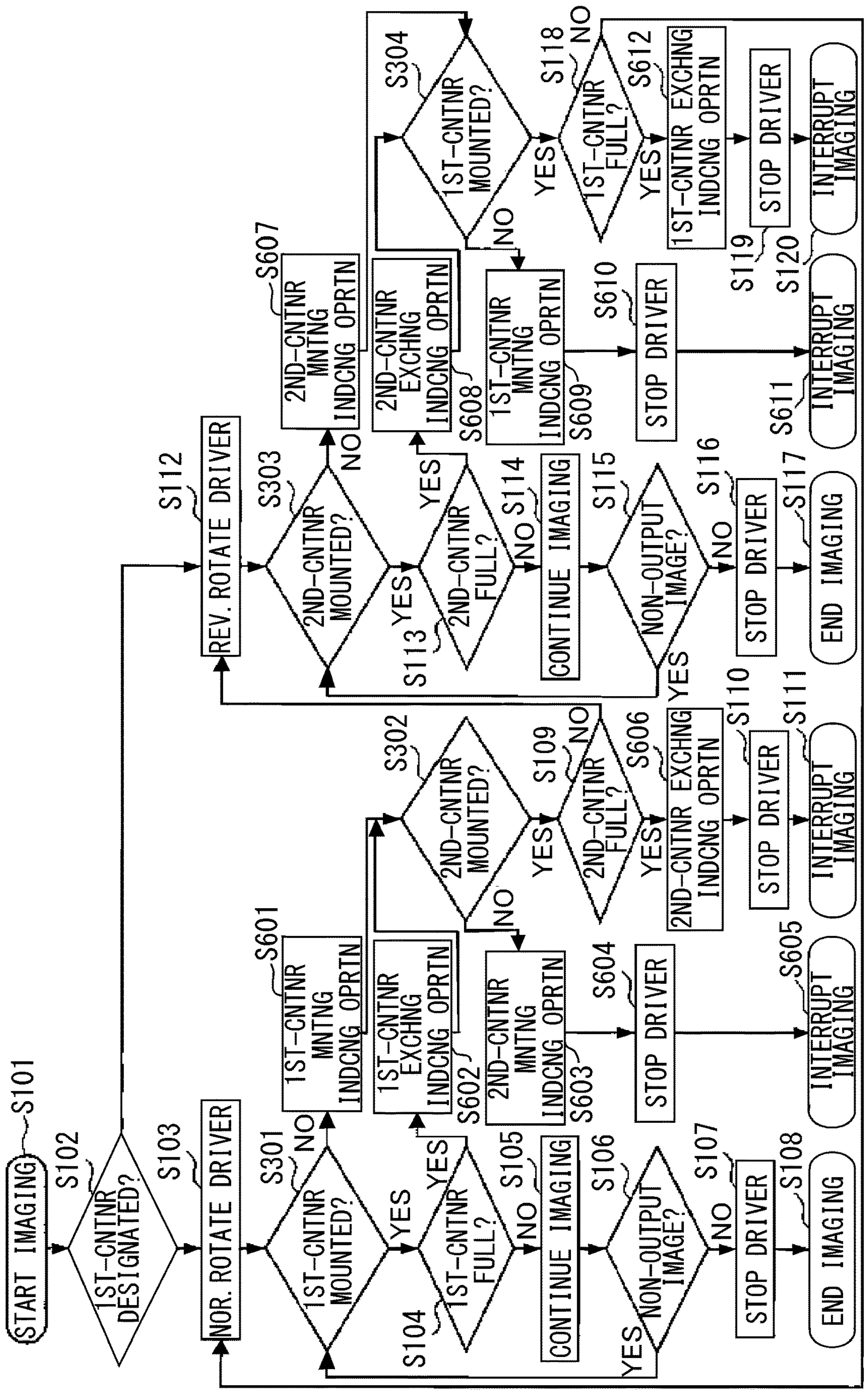

FIG. 25 is a flowchart of an operation of the developer collecting device including a notification operation inducing mounting and exchange of the developer collecting container.

DESCRIPTION OF THE EMBODIMENTS

A developer collecting device and an image forming apparatus according to the present invention will be described with reference to the drawings.

Embodiment 1

1. Image Forming Apparatus

Figure 1:
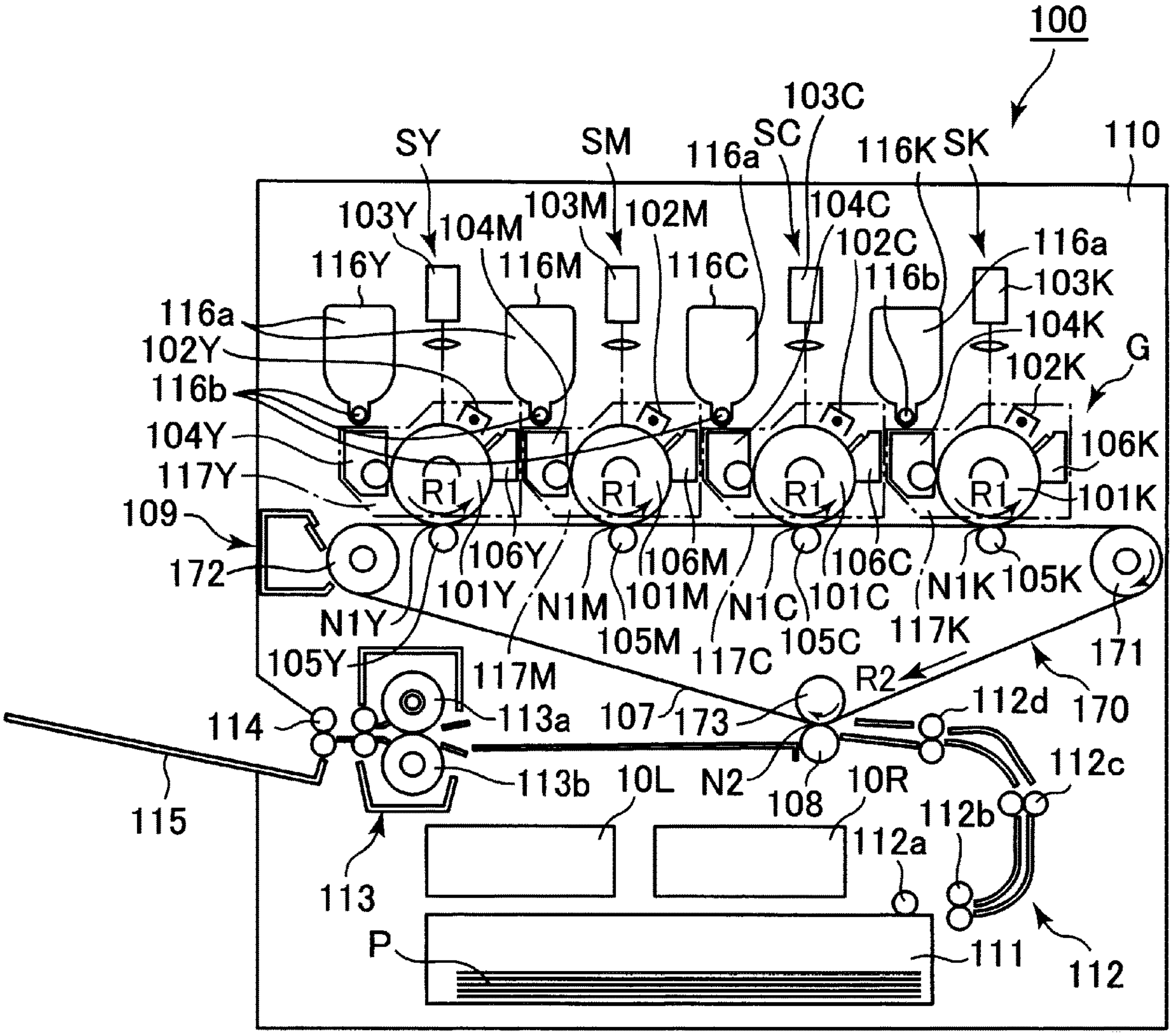
FIG. 1 is a schematic sectional view of an image forming apparatus.

FIG. 1 is a schematic sectional view (cross-section substantially perpendicular to a rotational axis direction of a photosensitive drum 101 described later) of an image forming apparatus 100 in this embodiment according to the present invention. The image forming apparatus 100 in this embodiment is a tandem-type printer capable of forming a full-color image by employing an electrophotographic type and an intermediary transfer type.

Incidentally, as regards the image forming apparatus 100 and constituent elements thereof, a front side on the drawing sheet of FIG. 1 is referred to as a "front" side, and a rear side on the drawing sheet of FIG. 1 is referred to as a "rear" side. An operator such as a user or a service person performs, in general, an operation of the image forming apparatus 100 from the front side of the image forming apparatus 100. A front-rear direction of the image forming apparatus 100 is substantially parallel to a rotational axis direction of the photosensitive drum 1 described later. Further, as regards the image forming apparatus 100 and the constituent elements thereof, a left side and a right side as viewed from the front side are referred to as a left side and a right side, respectively. A left-right direction of the image forming apparatus 100 corresponds to a widthwise direction of the image forming apparatus 100. Further, as regards the image forming apparatus 100 and the constituent elements thereof, an up-down direction refers to an up-down direction with respect to the direction of gravitation (vertical direction), but does not mean only right above and right below, and also includes an upper side and a lower side of a horizontal plane passing through an associated element or position.

The image forming apparatus 100 includes as a plurality of image forming means, first to fourth stations SY, SM, SC and SK for forming toner images of yellow (Y), magenta (M), cyan (C) and black (K), respectively. As regards elements having the same or corresponding functions and constitutions in the respective stations SY, SM, SC and SK, suffixes Y, M, C and K representing the elements for associated colors are omitted, and the elements will be collectively described in some instances. In this embodiment, the station S is constituted by including the photosensitive drum 101, a charging device 102, an exposure device 103, a developing device 104, a primary transfer roller 105, a drum cleaning device 106, and the like. In this embodiment, the plurality (four in this embodiment) of stations SY, SM, SC and SK are provided and disposed side by side along a direction crossing the direction of gravitation, particularly along a substantially horizontal direction in this embodiment.

The photosensitive drum 101 which is a rotatable drum-shaped photosensitive member (electrophotographic photosensitive member) as a first image bearing member is rotationally driven in an indicated arrow R1 direction in FIG. 1. In this embodiment, the four photosensitive drums 101 are disposed side by side along the substantially horizontal direction. A surface of the rotating photosensitive drum 101 is electrically charged uniformly to a predetermined polarity (negative in this embodiment) by the charging device 102 as a charging means.

The surface of the charged photosensitive drum 101 is subjected to scanning exposure to light in accordance with image information by the exposure device (laser scanner) 103 as an exposure means, so that an electrostatic latent image (electrostatic latent image) is formed on the photosensitive drum 101. The electrostatic image formed on the photosensitive drum 101 is developed (visualized) by supplying the toner by the developing device 104 as a developing means, so that the toner image is formed on the photosensitive drum 101. In this embodiment, the toner charged to the same polarity (positive in this embodiment) as the charge polarity of the photosensitive drum 101 is deposited on an exposed portion (image portion) of the photosensitive drum 101 which is lowered in absolute value of the potential by the exposure to light after the photosensitive drum 101 is charged uniformly. In this embodiment, the normal charge polarity of the toner which is the charge polarity of the toner during the development is the negative polarity.

An intermediary transfer belt 107 which is an intermediary transfer member constituted by an endless belt as a second image bearing member is provided opposed to the for photosensitive drums 101. The intermediary transfer belt 107 is extended around a driving roller 171, a tension roller 172 and a secondary transfer opposite roller 173 which are used as a plurality of stretching rollers (supporting rollers), and is stretched with a predetermined tension. The driving roller 171 is rotationally driven and a driving force is transmitted to the intermediary transfer belt 107, so that the intermediary transfer belt 107 is rotated (circulated and moved) in an arrow R2 direction in FIG. 1. On an inner peripheral surface side of the intermediary transfer belt 107, primary transfer rollers 105 which are roller-type primary transfer members as primary transfer means are provided correspondingly to the photosensitive drums 101. Each of the primary transfer rollers 105 is pressed (urged) against the intermediary transfer belt 107 toward the associated photosensitive drum 101, so that a primary transfer portion (primary transfer nip) N1 where the photosensitive drum 101 and the intermediary transfer belt 107 contact each other.

The toner image formed on the rotating photosensitive drum 101 is primary-transferred onto the rotating intermediary transfer belt 107 by the action of the primary transfer roller 105. During the primary transfer, to the primary transfer roller 105, a primary transfer voltage which is a DC voltage of an opposite polarity to the normal charge polarity of the toner is applied. For example, during full-color image formation, the respective color toner images of yellow, magenta, cyan and black formed on the respective photosensitive drums 101 are successively transferred superposedly onto the intermediary transfer belt 107.

At a position opposing the secondary transfer opposite roller 173 on an outer peripheral surface side of the intermediary transfer belt 107, a secondary transfer roller 108 which is a roller-type secondary transfer member as a secondary transfer means is provided. The secondary transfer roller 108 is pressed (urged) against the intermediary transfer belt 107 toward the secondary transfer opposite roller 173 and forms a secondary transfer portion (secondary transfer nip) N2 where the intermediary transfer belt 107 and the secondary transfer roller 108 are in contact with each other.

The toner images formed on the intermediary transfer belt 107 as described above are secondary-transferred onto the recording material (recording medium, sheet) P, such as a recording sheet, nipped and fed at the secondary transfer portion N2 by the intermediary transfer belt 107 and the secondary transfer roller 108. During the secondary transfer, to the secondary transfer roller 108, a secondary transfer voltage which is a DC voltage of an opposite polarity to the normal charge polarity of the toner during is applied. The recording material P is accommodated in a cassette 111 as a recording material accommodating portion. The recording material P is supplied from the cassette 111 to the secondary transfer portion N2 by a recording material feeding device 112. The recording material feeding device 112 includes a pick-up roller 112*a*, a feeding roller pair 112*b*, a conveying roller pair 112*c*, a registration roller pair 112*d*, and the like. The pick-up roller 112*a* sends recording materials P one by one from the cassette 111. The feeding roller pair 112*b* and the conveying roller pair 112*c* feed and convey the recording material P sent from the cassette 111. The registration roller pair 112*d* not only once stops the recording material P conveyed by the feeding roller pair 112*b* and the conveying roller pair 112*c* but also sends the recording material P toward the secondary transfer portion N2 in synchronism with timing of the toner images on the intermediary transfer belt 107.

The recording material P on which the toner images are transferred is conveyed to a fixing device 113. The fixing device 113 includes a fixing roller 113*a* provided with a heat source and a pressing roller 113*b* press-contacted to the fixing roller 113*a*. The fixing device 113 heats and presses the recording material P carrying unfixed toner images by nipping and conveying (feeding) the recording material P between the fixing roller 113*a* and the pressing roller 113*b*, so that the fixing device 113 fixed (melts and sticks) the toner images onto the recording material P. The recording material P on which the toner images are fixed is discharged (outputted) by a discharging roller 114 onto a tray 115 provided outside the apparatus main assembly 110 of the image forming apparatus 100.

Figure 2:
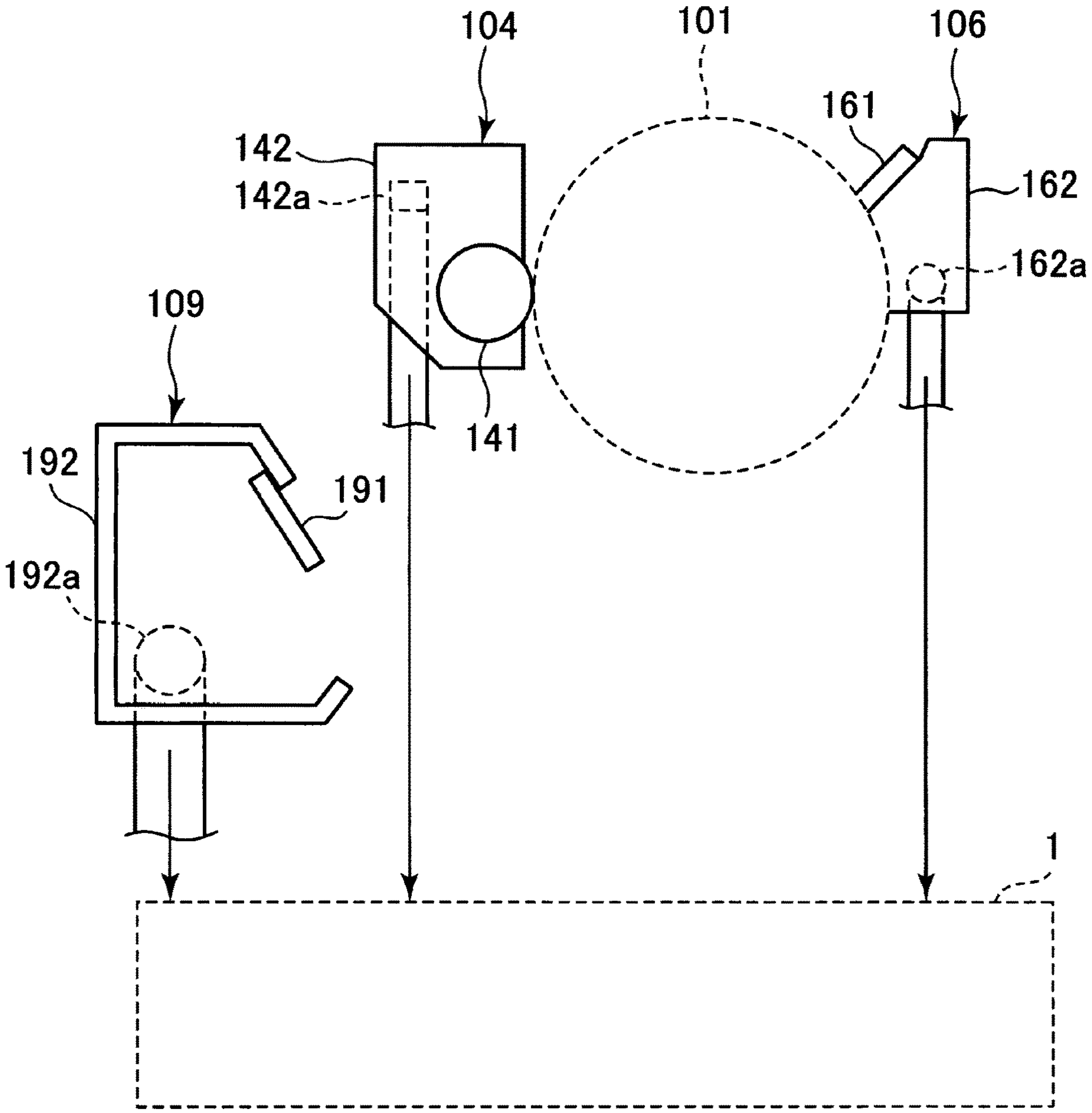
FIG. 2 is a schematic view showing a discharge mode of a collected developer from an image forming portion.

Further, toner (primary transfer residual toner) remaining on the photosensitive drum 101 without being transferred onto the intermediary transfer belt 107 during the primary transfer is removed and collected from the photosensitive drum 101 by the drum cleaning device 106 as a photosensitive member cleaning means. As shown in FIG. 2, the drum cleaning device 106 includes a drum cleaning blade 161 formed with an elastic member as a cleaning member and a drum cleaning container 162 as a toner collecting portion. The drum cleaning device 106 scrapes off the primary transfer residual toner from the surface of the rotating photosensitive drum 101 by the drum cleaning blade 161 disposed in contact with the surface of the photosensitive drum 101 and accommodates the toner inside the drum cleaning container 162.

Further, on the other peripheral surface side of the intermediary transfer belt 107, at a position opposing the tension roller 172, a belt cleaning device 109 as an intermediary transfer belt cleaning means is provided. Toner (secondary transfer residual toner) remaining on the intermediary transfer belt 107 without being transferred on the recording material P during the secondary transfer is removed and collected from the intermediary transfer belt 107 by the belt cleaning device 109. As shown in FIG. 2, the belt cleaning device 109 includes a belt cleaning blade 191 formed with an elastic member as a cleaning member and a belt cleaning container 192 as a toner collecting portion. The belt cleaning device 109 scrapes off the secondary transfer residual toner from the surface of the rotating intermediary transfer belt 107 by the belt cleaning blade 191 disposed in contact with the surface of the intermediary transfer belt 107 and accommodates the toner inside the belt cleaning container 192.

The primary transfer residual toner accommodated in the drum cleaning container 162 is fed by an unshown feeding means provided inside the drum cleaning container 162. Further, this primary transfer residual toner is discharged through a drum cleaning container discharge opening 162*a* which is an opening and is sent as a collected developer to a developer collecting device 1 described later. Further, the secondary transfer residual toner accommodated in the belt cleaning container 192 is fed by an unshown feeding means provided inside the belt cleaning container 192. Then, this secondary transfer residual toner is discharged through a belt cleaning container discharge opening 192*a* which is an opening and is sent as a collected developer to the developer collecting device 1 described later.

In this embodiment, in each of the stations S, the photosensitive drum 101 and, as process means actable on the photosensitive drum 101, the charging device 102, the developing device 104 and the cleaning device 106 integrally constitute a process cartridge 117. The process cartridge 117 is constituted so as to be mountable in and dismountable from the apparatus main assembly 110 by being pulled out to the front side of the image forming apparatus 100. The process cartridge 117 for the respective colors have the substantially same structure except that colors of the toners accommodated in the developing devices 104 are different from each other.

Further, in this embodiment, the intermediary transfer belt 107, the stretching rollers 171 to 173 of the intermediary transfer belt 107, the respective primary transfer rollers 105 and the belt cleaning device 109 and the like are integrally assembled into a unit and thus constitute an intermediary transfer unit 170. The intermediary transfer unit 170 is constituted so as to be mountable in and dismountable from the apparatus main assembly 110 by being pulled out from the right side of the image forming apparatus 100.

Further, the image forming apparatus 100 includes toner cartridges 116Y, 116M, 116C and 116K accommodating developers (supply developers) to be supplied to the developing devices 104Y, 104M, 104C and 104K. Each of the toner cartridges 116 is constituted so as to be mountable in and dismountable from the apparatus main assembly 110 by being pulled out to the front side of the image forming apparatus 100. The toner cartridges 116 for the respective colors have the substantially same structure except that colors of the toners accommodated therein and different from each other. Each of the toner cartridges 116 includes a supply developer accommodating portion 116*a* for accommodating the supply developer and a supplying screw 116*b* which is a supplying member for supplying the supply developer, inside the supply developer accommodating portion 116*a*, to the developing device 104.

Here, in this embodiment, the developing device 104 uses, as the developer, a two-component developer containing toner (non-magnetic toner particles) and a carrier (magnetic carrier particles). As shown in FIG. 2, the developing device 104 include a rotatable developing sleeve 141 as a developer carrying member and a developer container 142 for accommodating (containing) the developer. The developing device 104 carries the developer containing the toner and the carrier on the developer sleeve 141 and feeds the developer to a developing position, where the photosensitive drum 101 and the developing sleeve 141 oppose each other, by rotation of the developing sleeve 141. The developing device 104 supplies the toner of the developer at the developing position to the electrostatic image on the photosensitive drum 101, so that the toner image is formed on the photosensitive drum 101. Further, the developer accommodated inside the developer container 142 and the supply developer supplied from the toner cartridge 116 are fed and circulated while being stirred by an unshown stirring and feeding means provided inside the developing container 142. In this embodiment, the supply developer supplied from the toner cartridge 116 to the developing device 104 contains the toner and the carrier. Further, the developer (containing the toner and the carrier) which became excessive by the supply of the supply developer and which exists inside the developing container 142 is discharged through the developer container discharge opening 142*a* which is the opening with circulation and feeding of the developer inside the developer container 142, so that the developer is sent as the collected developer to the developer collecting device 1 described later.

In this embodiment, an image forming portion G which is a mechanism portion G for forming the images on the recording material P by using the developers is constituted by the respective stations S, the intermediary transfer unit 170, the secondary transfer roller 108 and the fixing device 13. Incidentally, FIG. 2 is a schematic view showing a discharge made of the collected developer from the image forming portion G (the drum cleaning devices 106, the developing devices 104 and the belt cleaning devices 109 of the respective stations S).

2. Developer Collecting Container

In this embodiment, first and second developer collecting containers 10L and 10R are provided as a plurality of developer collecting containers (collected developer containers) so as to be mountable in and dismountable from the apparatus main assembly 110 of the image forming apparatus 100. In this embodiment, the first and second developer collecting containers 10L and 10R are provided side by side along the substantially horizontal direction inside the apparatus main assembly 110. Particularly, in this embodiment, the first and second developer collecting containers 10L and 10R have the substantially same structure and are disposed inside the apparatus main assembly 110 in parallel at the substantially same height (level) with respect to the up-down direction. Further, the collected developer sent from the image forming portion G to the developer collecting device 1 described later is selectively fed and accumulated into either one of the first and second developer collecting containers 10L and 10R. In this embodiment, as described above, the collected developer is discharged in the image forming portion G from the drum cleaning devices 106 and the developing devices 104 of the stations S and from the belt cleaning device 109. Further, in the case where the inside of either one of the first and second developer collecting containers 10L and 10R becomes full with the collected developer, a feeding destination of the collected developer is switched to the other container, and the container full with the collected developer is exchanged to a blank container.

Incidentally, arrangement of the first and second developer collecting container 10L and 10R side by side along the substantially horizontal direction includes the case where the first and second developer collecting containers 10L and 10R are disposed so as to at least partially overlap with each other with respect to the up-down direction. Each of the first and second developer collecting containers 10L and 10R is a box-like container which has a predetermined length with respect to a longitudinal direction and the widthwise direction (short-side direction) and a predetermined thickness (height) with respect to a thickness direction and which has a substantially rectangular cross-section substantially perpendicular to the longitudinal direction. The longitudinal direction is a direction in which the container is disposed inside the apparatus main assembly 110 along the front-rear direction of the image forming apparatus 100. Further, the short-side direction is a direction in which the container is disposed inside the apparatus main assembly 110 along the left-right direction of the image forming apparatus 100. Further, the thickness direction is a direction in which the container is disposed inside the apparatus main assembly 110 along the up-down direction of the image forming apparatus 100. Inside the first and second developer collecting containers 10L and 10R, hollow collected developer accommodating portions 11L and 11R (see FIGS. 6 and 7) each accommodating the collected developer therein are provided, respectively. As described above, in this embodiment, the first and second developer collecting containers 10L and 10R have the substantially same structure, and each container can be mounted inside the apparatus main assembly 110 on not only a left side but also a right side. In this embodiment, inside the apparatus main assembly 110, the first developer collecting container 10L is mounted on the left side, and the second developer collecting container 10R is mounted in the right side.

Parts (a) and (b) of FIG. 3 are schematic perspective views of an outer appearance of the image forming apparatus for illustrating a mounting mode of the first and second developer collecting containers 10L and 10R as viewed from an obliquely front side. Part (a) of FIG. 3 shows a state in which a container exchanging door 118 described later is closed, and part (b) of FIG. 3 shows a state in which the container exchanging door 118 is opened and in which the first and second developer collecting containers are mountable and dismountable through the container exchanging door 118. On the front side of the image forming apparatus 100, the container exchanging door 118 which not only constitutes a part of an outer casing cover of the image forming apparatus 100 but also enables mounting and dismounting of the first and second developer collecting containers 10L and 10R is provided. In this embodiment, the container crossing door 118 is constituted by a single (common) openable (closable) member through which both the first and second developer collecting containers 10L and 10R are mountable and dismountable. In this embodiment, the container exchanging door 118 has a substantially rectangular shape extending in the left-right direction as viewed from the front side. Further, in this embodiment, the container exchanging door 118 is constituted so as to be rotatable at a lower portion thereof about a rotational axis extending along the left-right direction crossing the up-down direction. Further, the container exchanging door 118 can be opened and closed by rotating an upper side thereof about the rotational axis extending along the left-right direction on a lower side with respect to the up-down direction by an operation of an operator.

As shown in part (a) of FIG. 3, the container exchanging door 118 assumes, in a closed state, a single panel-like outer appearance equal in size, with respect to the left-right direction and the up-down direction, to a front panel 111*a* of the cassette 111 provided downward adjacent to the container exchanging door 118. For that reason, a complicated outer appearance due to provision of two containers (first and second developer collecting containers 10L and 10R) is suppressed. Further, by opening the single container exchanging door 118, the mounting and the dismounting of either one of the first and second developer collecting containers 10L and 10R can be carried out. For that reason, a wasteful operation due to erroneous opening and closing of the door, which can occur in the case where each of the plurality of developer collecting containers is independently provided with a container exchanging door can be suppressed.

As shown in part (b) of FIG. 3, by opening the container exchanging door 118, the operator has access to either one of the first and second developer collecting containers 10L and 10R. The apparatus main assembly 110 is provided with first and second container mounting portions 119L and 119R in which the first and second developer collecting containers 10L and 10R are mounted, respectively. The first and second container mounting portions 119L and 119R are provided with first and second container supporting portions 120L and 120R, respectively, extending in the front-rear direction so as to support a lower side of the first and second developer collecting containers 10L and 10R, respectively. The first and second container mounting portions 119L and 119R have rail-like structures (not shown) in which, for example, the first and second container supporting portions 120L and 120R engage with the first and second developer collecting containers 10L and 10R, respectively. By this, the first and second developer collecting containers 10L and 10R are slid (moved) from the front side toward the rear side and thus can be disposed at predetermined positions inside the apparatus main assembly 110. Further, the first and second developer collecting containers 10L and 10R is slid (moved) from the rear side toward the front side and thus is pulled out from the predetermined positions inside the apparatus main assembly 110, so that the first and second developer collecting containers 10L and 10R can be easily dismounted from the apparatus main assembly 110.

As shown in part (b) of FIG. 3, on an inside surface of the container exchanging door 118, first and second discrimination displays (discrimination display portions) 121L and 121R are provided so that the operator can visually recognize the container exchanging door 118 in an open state. The discrimination display portions 121L and 121R are disposed at positions corresponding to the first and second developer collecting containers 10L and 10R, respectively, with respect to the left-right direction. In this embodiment, the discrimination display portions 121L and 121R are disposed on an inside surface of the container exchanging door 118 positioned adjacent to the front side of the respective mounting portions in a range in which the discrimination display portions 121L and 121R at least partially overlap with the first and second container mounting portions 119L and 119R, respectively, with respect to the left-right direction. In this embodiment, the left side-first discrimination display portion (first mark) 121L is constituted by a seal on which a character such as a "container 1" (or a "left container") as first discrimination information is displayed for discriminating the first developer collecting container 10L. Further, in this embodiment, the right side-second discrimination display portion (second mark) 121R is constituted by a seal on which a character such as a "container 2" (or a "right container") as second discrimination information is displayed for discriminating the second developer collecting container 10R. These discrimination display portions 121L and 121R are used for facilitating discrimination of an associated container when display prompting the operator to exchange either one of the developer collecting containers 10L and 10R is made in an operating portion 130 (FIG. 11) of the image forming apparatus 100 as described later. Incidentally, in this embodiment, the discrimination display portions 121L and 121R were provided on the inside surface of the container exchanging door 18, but the present invention is not limited thereto. The discrimination display portions 121L and 121R may also be provided corresponding to the first and second developer collecting containers 10L and 10R, respectively, for example, on the front surface of the panel adjacent to the first and second container mounting portions 119L and 119R, respectively.

3. Developer Collecting Device

A structure of the developer collecting device (feeding device) 1 in this embodiment will be described.

<General Structure>

FIG. 4 is a front view of the developer collecting device 1 in this embodiment. FIG. 5 is a perspective view of the developer collecting device 1 in this embodiment as viewed from an obliquely front side. In FIGS. 4 and 5, a collected developer feeding passage 2 in the developer collecting device 1 is principally shown, and the first and second developer collecting containers 10L and 10R connected to the developer collecting device 1 are also shown.

In this embodiment, the collected developer feeding passage 2 of the developer collecting device 1 roughly includes an upstream feeding portion 3 and a downstream feeding portion 4. The upstream feeding portion 3 receives the collected developer discharged from the image forming portion G (the drum cleaning devices 106 and the developing devices 104 of the respective stations S and the belt cleaning device 109. The downstream feeding portion 4 are receives the collected developer from the upstream feeding portion 3 and feeds the collected developer to the first and second developer collecting containers 10L and 10R.

<Upstream Feeding Portion>

With reference to FIGS. 4 and 5, the upstream feeding portion 3 includes first to fifth discharging pipes 31 to 35 and a main discharging pipe 36. In this embodiment, the first to fifth discharging pipes 31 to 35 and the main discharging pipe 36 are provided in the neighborhood of a rear end portion inside the apparatus main assembly 110.

The first to fifth discharging pipes 31 to 35 as discharging feeding portions are hollow pipe-like members extending in the up-down direction substantially along the direction of gravitation.

The first discharging pipe 31 is provided with a first discharging receiving opening 31*a* which is an opening connected to a belt cleaning container discharging opening 192*a* (FIG. 2) and a second discharging receiving opening 31*b* which is an opening connected to a developing container discharging opening 142*a* for yellow (FIG. 2). The second discharging pipe 32 is provided with a first discharging receiving opening 32*a* connected to a drum cleaning container discharging opening 162*a* for yellow (FIG. 2) and a second discharging receiving opening 32*b* which is an opening connected to a developing container discharging opening 142*a* for magenta (FIG. 2). The third discharging pipe 33 is provided with a first discharging receiving opening 33*a* connected to a drum cleaning container discharging opening 162*a* for magenta (FIG. 2) and a second discharging receiving opening 33*b* which is an opening connected to a developing container discharging opening 142*a* for cyan (FIG. 2). The fourth discharging pipe 34 is provided with a first discharging receiving opening 34*a* connected to a drum cleaning container discharging opening 162*a* for cyan (FIG. 2) and a second discharging receiving opening 34*b* which is an opening connected to a developing container discharging opening 142*a* for black (FIG. 2). Further, the fifth discharging pipe 35 is provided with a discharging receiving opening 35*a* connected to a drum cleaning container discharging opening 162*a* for black (FIG. 2). Further, lower end portions of the first to fifth discharging pipe 31 to 35 are connected to the main discharging pipe 36, so that each of the insides of the first to fifth discharging pipes 31 to 35 and the inside of the main discharging pipe 36 communicate with each other so as to enable delivery of the collected developer therebetween.

In this embodiment, the main discharging pipe 36 is a hollow pipe-like member extending in the left-right direction along the substantially horizontal direction. Particularly, in this embodiment, the main discharging pipe 36 is constituted by a circular pipe substantially elliptical in cross-section substantially perpendicular to an extension direction (axial direction) thereof. To upper side portions of the main discharging pipe 36, the first to fifth discharging pipes 31 to 35 are connected, respectively, and the inside of the main discharging pipe 36 and each of the insides of the first to fifth discharging pipes 31 to 35 communicate with each other so as to permit delivery of the collected developer. Inside (in the hollow portion of) the main discharging pipe 36, a discharging screw 37 as a discharging feeding member is provided. In this embodiment, the discharging screw 37 is constituted by an anaxial screw conveyor (spring anger) rotatable about a rotation shaft extending in the left-right direction along the extension direction (substantially horizontal direction) of the main discharging pipe 36. The discharging screw 37 feeds the collected developer inside the main discharging pipe 36 while stirring the collected developer. Further, a lower side portion of the main discharging pipe 36 positioned between opposite end portions of the main discharging pipe 36 with respect to the extension direction is provided with a main discharging opening 36*a*. This main discharging opening 36*a* is an opening through which the collected developer is dropped and discharged from the main discharging pipe 36 and then is delivered to the downstream feeding portion 4. Incidentally, in this embodiment, the main discharging opening 36*a* is formed at the following position with respect to the horizontal direction in a cross-section substantially perpendicular to the front-rear direction of the image forming apparatus 100. That is, with respect to the direction, the main discharging opening 36*a* is formed in a lower side portion of the main discharging pipe 36 so as to be positioned between first and second lateral pipe discharging openings 42*b* and 42*c* provided in a lateral pipe 42 of the downstream feeding portion 4 described later.

The collected developers sent to the first to fifth discharging pipes 31 to 35 are dropped inside (in the hollow portions of) the first to fifth discharging pipes 31 to 35 by the gravitation and are moved to the main discharging pipe 36. The collected developers dropped and merged with each other in the main discharging pipe 36 are fed to the main discharging opening 36*a* by the discharging screw 37. In this embodiment, the discharging screw 37 has a helical shape such that a left side-first portion 37*a* and a right side-second portion 37*b* with respect to the rotational axis direction thereof are different in helical direction with a position corresponding to the main discharging opening 36*a* as a boundary. The discharging screw 37 is rotationally driven in a predetermined direction by transmission of a rotational driving force from an unshown driving source (discharging screw driving portion) provided in the apparatus main assembly 110 through a drive transmission member (single or plurality of gears or the like) 125. By this, the collected developers sent from the first and second discharging pipes 31 and 32 to the main discharging pipe 36 are fed in a direction from the left side to the right side by the first portion 37*a* of the discharging screw 35 and are sent to the main drum cleaning opening 36*a*. On the other hand, the collected developers sent from the third to fifth discharging pipes 33 to 35 to the main discharging pipe 36 are fed in a direction from the right side to the left side by the second portion 37*b* of the discharging screw 37 and are sent to the main discharging opening 36*a*. The collected developers fed to the main discharging opening 36*a* are dropped through the main discharging opening 36*a* and then are moved toward a vertical pipe 41 of the downstream feeding portion 4 described later.

<Downstream Feeding Portion>

With reference to FIGS. 4 and 5, the downstream feeding portion 4 includes the vertical pipe 41, the lateral pipe 42, and first and second collecting pipes 44L and 44R. The vertical pipe 41 and the lateral pipe 42 are disposed inside the apparatus main assembly 110 in the neighborhood of a rear side-end portion. The first and second collecting pipes 44L and 44R are disposed and extended from the rear side toward the front side above the first and second developer collecting containers 10L and 10R, respectively, which are disposed inside the apparatus main assembly 110.

The developer collecting device 1 includes the vertical pipe 41 as a pipe-like vertical feeding portion for guiding the collected developer, discharged from the image forming portion G, from above to below with respect to the direction of gravitation. In this embodiment, the vertical pipe 41 is a hollow pipe-like member extending vertically along the substantially direction of gravitation. Incidentally, the vertical pipe 41 may also be inclined with respect to the direction of gravitation. Further, in this embodiment, inside the vertical pipe 41, the collected developer is dropped and moved by the gravitation, but a feeding member for feeding the collected developer may also be provided inside the vertical pipe 41. To an upper side portion of the vertical pipe 41, the main discharging pipe 36 of the upstream feeding portion 3 is connected. Further, at an upper side end portion of the vertical pipe 41, a vertical pipe receiving opening 41*a* which is an opening through which the collected developer discharged through the main discharging opening 36*a* is received by the vertical pipe 41 is formed at a position corresponding to the main discharging opening 36*a* of the main discharging pipe 36. By this, the inside of the main discharging pipe 36 and the inside of the vertical pipe 41 communicate with each other through the main discharging opening 36*a* and the vertical pipe receiving opening 41*a*. Further, at a lower side end portion of the vertical pipe 41, a vertical pipe discharging opening 41*b* which is an opening through which the collected developer is dropped and discharged from the vertical pipe 41 by the gravitation and then is delivered to the lateral pipe 42 is formed.

Incidentally, in this embodiment, the vertical pipe discharging opening 41*a* and the vertical pipe discharging opening 41*b* are formed at the following positions with respect to the horizontal direction in the cross-section substantially perpendicular to the front-rear direction of the image forming apparatus 100. That is, with respect to the direction, the vertical pipe discharging opening 41*a* and the vertical pipe discharging opening 41*b* are formed in the vertical pipe 41 so as to be positioned between first and second lateral pipe discharging openings 42*b* and 42*c* provided in the lateral pipe 42 described later.

The developer collecting device 1 includes the lateral pipe 42 as a pipe-like lateral feeding portion capable of guiding the collected developer, fed through the inside of the vertical pipe 41, toward the first developer collecting container 10L and the second developer collecting container 10R along a direction crossing the direction of gravitation. The lateral pipe 42 is a hollow pipe-like member extending in the left-right direction along the substantially horizontal direction. Incidentally, the lateral pipe 42 may also be inclined with respect to the horizontal direction. Particularly, in this embodiment, the lateral pipe 42 is constituted by a circular pipe substantially circular in cross-section substantially perpendicular to the extension direction (axial direction) thereof. To an upper side portion of the lateral pipe 42 between opposite end portions of the lateral pipe 42 with respect to the extension direction, the vertical pipe 42 is connected. Further, at the upper side end portion of the lateral pipe 42, at a position corresponding to the vertical pipe discharging opening 41*b* of the vertical pipe 41, a lateral pipe receiving portion 42*a* which is an opening through which the collected developer discharged through the vertical pipe discharging opening 41*b* is received by the lateral pipe 42 is formed. By this, the inside of the vertical pipe 41 and the inside of the lateral pipe 42 communicate with each other through the vertical pipe discharging opening 41*b* and the lateral pipe receiving opening 42*a*. Further, at lower side end portions of the lateral pipe 42 positioned on opposite sides of the lateral pipe 42 with respect to the extension direction, first and second lateral pipe discharging openings 42*b* and 42*c* are provided, respectively. These first and second lateral pipe discharging openings 42*b* and 42*c* are openings for delivering the collected developer to the first and second collecting pipes 44L and 44R, respectively, by dropping and discharging the collected developer from the lateral pipe 42 by the gravitation. The first lateral pipe discharging opening 42*b* is formed in the neighborhood of a left side end portion (first end portion) of the lateral pipe 42, and the second lateral pipe discharging opening 42*c* is formed in the neighborhood of a right side end portion (second end portion) of the lateral pipe 42. Here, the above-described lateral pipe receiving opening 42*a* is provided in the lateral pipe 42 so as to be positioned between the first and second lateral pipe discharging openings 42*b* and 42*c* with respect to the horizontal direction in cross-section substantially perpendicular to the front-rear direction of the image forming apparatus 100. Thus, the lateral pipe 42 is provided with a first lateral pipe discharging opening 42*b*, provided on a first end portion side with respect to an extension direction of the lateral pipe 42, for discharging the collected developer from the lateral pipe 42 toward the first developer collecting container 10L. Further, the lateral pipe 42 is provided with a second lateral pipe discharging opening 42*c*, provided on a second end portion side opposite from the first end portion side with respect to the extension direction of the lateral pipe 42, for discharging the collected developer from the lateral pipe 42 toward the second developer collecting container 10R. Further, the lateral pipe 42 is provided with a lateral pipe receiving opening 42*a*, provided between the first lateral pipe discharging opening 42*b* and the second lateral pipe discharging opening 42*c* with respect to the extension direction of the lateral pipe 42, for receiving the collected developer from the vertical pipe 41 to the lateral pipe 42.

Inside (in the hollow portion of) the lateral pipe 42, a feeding screw 43 as a feeding member is provided. In this embodiment, the feeding screw 43 is constituted by an anaxial screw conveyor (spring auger) rotatable about a rotation shaft extending in the left-right direction along the extension direction (substantially horizontal direction) of the lateral pipe 42. In this embodiment, the feeding screw 43 has a helical shape such that a direction of winding is one direction. The feeding screw 43 feeds the collected developer inside the lateral pipe 42 while stirring the collected developer. The feeding screw 43 is rotationally driven by transmission of a rotational driving force from a driving portion 5. In this embodiment, the driving portion 5 is constituted by including a driving motor 51 as a driving source, and a driving train (single or plurality of gears or the like) 52 for transmitting the driving force from the driving motor 51 to the feeding screw 43. In this embodiment, the driving motor 51 is disposed on a right side portion of the lateral pipe 42, and the driving train 52 is connected to a right side portion of the feeding screw 43. The driving motor 51 of the driving portion 5 is rotatable in both of normal and reverse directions. By this, the driving portion 5 is capable of rotating the feeding screw 43 in a first direction and a second direction opposite to the first direction. As described above, the feeding screw 43 has the helical shape such that the direction of winding is one direction, and is rotated in the first direction, so that the feeding screw 43 feeds the collected developer inside the lateral pipe 42 from the right side-end portion (second end portion) side toward the left side-end portion (first end portion) side. Further, by rotation in the second direction, the feeding screw 43 feeds the collected developer inside the lateral pipe 42 from the left side-end portion (first end portion) side toward the right side-end portion (second end portion) side. Thus, the developer collecting device 1 includes the feeding screw 43 for feeding the collected developer inside the lateral pipe 42. The feeding screw 43 is provided with a helical-shaped portion with a direction of winding in which the collected developer is fed in the following manner. That is, the feeding screw 43 rotates in the first direction about a rotational axis along the extension direction of the lateral pipe 42 and thus feeds the collected developer along the rotational axis in a direction from the second end portion side toward the first end portion side. Further, this feeding screw 43 rotates in the second direction, opposite to the first direction, about the rotational axis and thus feeds the collected developer along the rotational axis in a direction from the first end portion side toward the second end portion side. Further, the developer collecting device 1 includes the driving portion 5 capable of rotationally driving the feeding screw 43 in the first and second directions.

The developer collecting device 1 includes a first collecting pipe 44L as a pipe-like first collecting feeding portion for guiding the collected developer, discharged through the first lateral pipe discharging opening 42*b*, toward the first developer collecting container 10L. Incidentally, the first collecting pipe 44L may also be inclined with respect to the horizontal direction. In this embodiment, the first collecting pipe 44L is a hollow pipe-like member extending in the substantially horizontal direction. Particularly, in this embodiment, the first collecting pipe 44L is constituted by a circular pipe substantially circular in cross-section substantially perpendicular to an extension direction (axial direction) thereof. The lateral pipe 42 is connected to an upper side portion of the first collecting pipe 44L positioned on a rear side-end portion with respect to the extension direction of the first collecting pipe 44L. Further, at the upper side portion of the first collecting pipe 44L, a first collecting receiving opening 44*a*L is formed in a position corresponding to the first lateral pipe discharging opening 42*b* of the lateral pipe 42. This first collecting receiving opening 44L is an opening for permitting reception of the collected developer, discharged through the first lateral pipe discharging opening 42*b*, by the first collecting pipe 44L. By this, the inside of the lateral pipe 42 and the inside of the first collecting pipe 44L communicate with each other through the first lateral pipe discharging opening 42*b* and the first collecting receiving opening 44*a*L. Further, at a lower side portion of the first collecting pipe 44L positioned at a front side-end portion with respect to the extension direction of the first collecting pipe 44L, a first collecting discharging opening 44*b*L is formed. This first collecting discharging opening 44*b*L is an opening for permitting delivery of the collected developer from the first collecting pipe 44L to the first developer collecting container 10L by dropping and discharging the collected developer by the gravitation. Thus, the first collecting pipe 44L includes the first collecting receiving opening 44*a*L, provided on one end portion side with respect to the extension direction of the first collecting pipe 44L, for permitting reception of the collected developer discharged through the first lateral pipe discharging opening 44*b*L, by the first collecting pipe 44L. Further, the first collecting pipe 44L includes the first collecting receiving opening 44*b*L, provided on the other end portion side with respect to the end portion of the first collecting pipe 44L, for permitting discharge of the collected developer from the first collecting pipe 44L toward the first developer collecting container 10L.

Inside (hollow portion of) the first collecting pipe 44L, a first collecting screw 45L as a first collecting feeding member is provided. In this embodiment, the first collecting screw 45L is constituted by an anaxial screw conveyor (spring anger) rotatable about a rotational axis extending in the front-rear direction along the extension direction (substantially horizontal direction) of the first collecting pipe 44L. In this embodiment, the first collecting screw 45L has a helical shape such that a direction of winding is one direction. The first collecting screw 45L feeds the collected developer inside the first collecting pipe 44L while stirring the collected developer. FIG. 7 is a sectional view taken along a Y-Y line of FIG. 4. As shown in FIG. 7, the first collecting screw 45L is rotationally driven by transmission of a rotational driving force from a first collecting driving portion 6L. In this embodiment, the first collecting driving portion 6L is constituted by including a first collecting driving motor 61L as a driving source and a first collecting driving train (single or plurality of gears or the like) 62L for transmitting the driving force from the first collecting driving motor 61L to the first collecting screw 45L. In this embodiment, the first collecting driving motor 61L is provided below the first collecting pipe 44L in the neighborhood of a rear side-end portion, and the first collecting driving train 62L is connected to the rear side-end portion of the first collecting screw 45L. The first collecting driving motor 61L of the first collecting driving portion 6L rotates in a predetermined direction. By this, the first collecting driving portion 6L rotationally drives the first collecting screw 45L in a predetermined direction. As described above, the first collecting screw 45L has the helical shape such that the direction of winding is one direction, and is rotated in the predetermined direction, and thus feeds the collected developer inside the first collecting pipe 44L from the rear side-end portion side toward a front side-end portion side. Thus, the developer collecting device 1 includes the first collecting screw 45L for feeding the collected developer inside the first collecting pipe 44L. The first collecting screw 45L includes the helical-shaped portion with a direction of winding in which the collected developer is fed in the following manner. That is, the first collecting screw 45L is rotated in the predetermined direction about the rotational axis along the extension direction of the first collecting pipe 44L, and thus feeds the collected developer along the rotational axis from one end portion side (rear side-end portion side) toward the other end portion side (front side-end portion side). Further, in this embodiment, the developer collecting device 1 includes the first collecting driving portion 6L for rotationally driving the first collecting screw 45L.

Further, the developer collecting device 1 includes a second collecting pipe 44R as a pipe-like second collecting feeding portion for guiding the collected developer, discharged through the second lateral pipe discharging opening 42*c*, toward the second developer collecting container 10R. In this embodiment, the second collecting pipe 44L is a hollow pipe-like member extending in the substantially horizontal direction. Incidentally, the second collecting pipe 44R may also be inclined with respect to the horizontal direction. Particularly, in this embodiment, the second collecting pipe 44R is constituted by a circular pipe substantially circular in cross-section substantially perpendicular to an extension direction (axial direction) thereof. The lateral pipe 42 is connected to an upper side portion of the second collecting pipe 44L positioned on a rear side-end portion with respect to the extension direction of the second collecting pipe 44R. Further, at the upper side portion of the first collecting pipe 44L, a second collecting receiving opening 44*a*R is formed in a position corresponding to the second lateral pipe discharging opening 42*c* of the lateral pipe 42. This second collecting receiving opening 44R is an opening for permitting reception of the collected developer, discharged through the second lateral pipe discharging opening 42*c*, by the second collecting pipe 44R. By this, the inside of the lateral pipe 42 and the inside of the second collecting pipe 44R communicate with each other through the second lateral pipe discharging opening 42*c* and the second collecting receiving opening 44*a*R. Further, at a lower side portion of the second collecting pipe 44R positioned at a front side-end portion with respect to the extension direction of the second collecting pipe 44R, a second collecting discharging opening 44*b*R is formed. This second collecting discharging opening 44*b*R is an opening for permitting delivery of the collected developer from the second collecting pipe 44R to the second developer collecting container 10R by dropping and discharging the collected developer by the gravitation. Thus, the second collecting pipe 44R includes the second collecting receiving opening 44*a*R, provided on one end portion side with respect to the extension direction of the second collecting pipe 44R, for permitting reception of the collected developer discharged from the second lateral pipe 44R, by the second collecting pipe 44R. Further, the second collecting pipe 44R includes the second collecting receiving opening 44*b*R, provided on the other end portion side with respect to the end portion of the second collecting pipe 44R, for permitting discharge of the collected developer from the second collecting pipe 44R toward the second developer collecting container 10R.

Inside (hollow portion of) the second collecting pipe 44R, a second collecting screw 45R as a second collecting feeding member is provided. In this embodiment, the second collecting screw 45L is constituted by an anaxial screw conveyor (spring anger) rotatable about a rotational axis extending in the front-rear direction along the extension direction (substantially horizontal direction) of the second collecting pipe 44R. In this embodiment, the second collecting screw 45R has a helical shape such that a direction of winding is one direction. The second collecting screw 45R feeds the collected developer inside the second collecting pipe 44R while stirring the collected developer. FIG. 6 is a sectional view taken along an X-X line of FIG. 4. As shown in FIG. 6, the second collecting screw 45R is rotationally driven by transmission of a rotational driving force from a second collecting driving portion 6R. In this embodiment, the second collecting driving portion 6R is constituted by including a second collecting driving motor 61R as a driving source and a second collecting driving train (single or plurality of gears or the like) 62R for transmitting the driving force from the second collecting driving motor 61R to the second collecting screw 45R. In this embodiment, the second collecting driving motor 61R is provided below the second collecting pipe 44R in the neighborhood of a rear side-end portion, and the second collecting driving train 62R is connected to the rear side-end portion of the second collecting screw 45R. The second collecting driving motor 61R of the second collecting driving portion 6R rotates in a predetermined direction. By this, the second collecting driving portion 6R rotationally drives the second collecting screw 45R in a predetermined direction. As described above, the second collecting screw 45R has the helical shape such that the direction of winding is one direction, and is rotated in the predetermined direction, and thus feeds the collected developer inside the second collecting pipe 44R from the rear side-end portion side toward a front side-end portion side. Thus, the developer collecting device 1 includes the second collecting screw 45R for feeding the collected developer inside the second collecting pipe 44R. The second collecting screw 45R includes the helical-shaped portion with a direction of winding in which the collected developer is fed in the following manner. That is, the second collecting screw 45R is rotated in the predetermined direction about the rotational axis along the extension direction of the second collecting pipe 44R, and thus feeds the collected developer along the rotational axis from one end portion side (rear side-end portion side) toward the other end portion side (front side-end portion side). Further, in this embodiment, the developer collecting device 1 includes the second collecting driving portion 6R for rotationally driving the second collecting screw 45R.

Incidentally, a constitution in which the first and second collecting pipes 44L and 44R are not provided and in which for example, the collected developer is sent from the lateral pipe 42 to the first and second developer collecting containers 10L and 10R directly may also be employed. In the case where the first and second collecting pipes 44L and 44R are provided, these pipes are capable of functioning as buffers each capable of holding the collected developer in a predetermined amount between the first and second developer collecting containers 10L and 10R. For example, even in the case where both the first and second developer collecting containers 10L and 10R become full, when the number of times of image formation is smaller than a predetermined value or the like, the image formation can be continued until the amount of the collected developer reaches the predetermined amount in which the first and second developer collecting containers 10L and 10R are capable of functioning as the buffers. Then, after the job is ended, it becomes possible to prompt the operator to exchange the first and second developer collecting containers 10L and 10R.

Herein, in this embodiment, the first and second developer collecting containers 10L and 10R are provided with first and second container receiving openings 12L and 12R at upper side portions positioned at a front side-end portion in a state in which the first and second developer collecting containers 10L and 10R are disposed at predetermined positions inside the apparatus main assembly 110. These first and second container receiving openings 12L and 12R are openings for permitting reception of the collected developers discharged from the first and second collecting discharging openings 44*b*L and 44*b*R into the first and second developer collecting containers 10L and 10R, respectively. When the first and second developer collecting containers 10L and 10R are mounted at predetermined positions inside the apparatus main assembly 110, the first and second container receiving openings 12L and 12R are disposed at positions corresponding to the first and second collecting discharging portions 44bL and 44bR, respectively. By this, the insides of the first and second collecting pipes 44L and 44R and the insides of the first and second developer collecting containers 10L and 10R communicate with each other. Incidentally, in this embodiment, at front side-end portions of the first and second collecting pipes 44L and 44R, first and second shutter members 46L and 46R for switching open and close states of the first and second collecting discharging openings 44bL and 44bR, respectively, are provided, respectively. These first and second shutter members 46L and 46R are provided on the first and second collecting pipes 44L and 44R, respectively, so as to be slidable (movable) in the front-rear direction, and are urged by shutter urging springs (not shown) in a direction from the rear side toward the front side. Further, immediately before the first and second developer collecting containers 10L and 10R are mounted at predetermined positions inside the apparatus main assembly 110, engaging portions (not shown) provided on the first and second developer collecting containers 10L and 10R engage with the first and second shutter members 46L and 46R, respectively. Then, the first and second developer collecting containers 10L and 10R are further inserted to predetermined positions into the apparatus main assembly 110, so that the first and second shutter members 46L and 46R are moved toward the rear side against an urging force of the above-described shutter urging springs and thus are opened. That is, at this time, the first and second shutter members 46L and 46R are disposed at open positions where the first and second collecting discharging openings 44bL and 44bR are opened, respectively. When the first and second developer collecting containers 10L and 10R are removed from the predetermined positions of the inside of the apparatus main assembly 110, by the operation reverse to the above-described operation, the first and second shutter members 46L and 46R are closed by the urging force of the above-described shutter urging springs. That is, at this time, the first and second shutter members 46L and 46R are disposed at closed positions where the first and second collecting discharging openings 44bL and 44bR are closed, respectively. Incidentally, the shutter members are not limited to shutter members which are opened and closed in interrelation with movement of the developer collecting containers, but for example, may also be opened and closed by appropriate actuator. Further, the first and second developer collecting containers 10L and 10R may also be provided with shutter members for opening and closing the first and second container receiving openings 12L and 12R in interrelation with the above-described mounting operation and dismounting operation, for example.

Further, in this embodiment, as shown in FIGS. 6 and 7, inside the first and second developer collecting containers 10L and 10R, first and second container screws 13L and 13R as container feeding members for feeding the collected developers accommodated in the collected developer accommodating portions 11L and 11R are provided, respectively. In this embodiment, the first and second container screws 13L and 13R are constituted so as to feed the collected developers from the front side toward the rear side in a state in which the first and second developer collecting containers 10L and 10R are disposed at the predetermined positions inside the apparatus main assembly 110. In this embodiment, each of the first and second container screws 13L and 13R includes a rotation shaft portion and a screw blade portion formed helically around the rotation shaft portion. At a rear side-end portion of the rotation shaft portion of each of the first and second container screws 13L and 13R, a drive-receiving portion is provided. Further, when the first and second developer collecting containers 10L and 10R are mounted at the predetermined positions inside the apparatus main assembly 110, the drive-receiving portions are connected to first and second couplings 63L and 63R, respectively, provided on the apparatus main assembly 110 side. In this embodiment, to these first and second couplings 63L and 63R, a rotational driving force is transmitted from the above-described first and second collecting driving portions 6L and 6R, respectively, and thus the first and second couplings 63L and 63R are rotated. By this, the first and second container screws 13L and 13R are rotated in interrelation with the first and second collecting screws 45L and 45R, respectively, and thus feed the collected developers inside the first and second developer collecting containers 10L and 10R.

Incidentally, the first and second couplings 63L and 63R are provided so as to be exposed from first and second container opposite portions 122L and 122R, respectively, described later as shown in FIG. 8.

Thus, the developer collecting device 1 is provided so as to be capable of being driven and includes a feeding portion capable of selectively feed the collected developer, discharged from the image forming portion G, to the first developer collecting container 10L or the second developer collecting container 10R. In this embodiment, this feeding portion includes the vertical feeding pipe 41, the latent feeding pipe 42, the feeding screw 43, the first and second collecting pipes 44L and 44R, the first and second collecting screws 45L and 45R, and the like.

<Container Sensors and so On>

In FIG. 8, the first and second container opposite portions 122L and 122R opposing the first and second developer collecting containers 10L and 10R in the rear side-end portions of the first and second container mounting portions 119L and 119R (part (b) of FIG. 3) of the apparatus main assembly 110 are shown.

Further, in this embodiment, the first and second container opposite portions 122L and 122R are provided with first and second container sensors 7L and 7R as container detecting means for detecting the presence or absence (mounting or dismounting state) of the first and second developer collecting containers 10L and 10R, respectively. In this embodiment, the first and second container sensors 7L and 7R are constituted by mechanical switches by which a signal outputted to a controller 150 (FIG. 11) described later changes depending on a state or urging or release of urging. The controller 150 is capable of controlling the driving portion 5 on the basis of detection results of the first and second container sensors 7L and 7R. The first container sensor 7L is urged by the first developer collecting container 7L when the first developer collecting container 7L is disposed at a predetermined position inside the apparatus main assembly 110, i.e., at a position where the first collecting discharging opening 44bL and the first container receiving opening 12bL communicate with each other. By this, the controller 150 is capable of detecting that the first developer collecting container 10L is disposed at the predetermined position. Further, when the first developer collecting container 10L is moved (removed) from the predetermined position, the urging of the first container sensor 7L by the first developer collecting container 10L is released. By this, the controller 150 is capable of detecting that the first developer collecting container 10L was moved from the predetermined position. Similarly, by a signal of the second container sensor 7R, the controller 150 is capable of detecting that the second developer collecting container 10R was disposed at the predetermined position or that the second developer collecting container 10R was moved from the predetermined position. Incidentally, the container detecting means is not limited to the mechanical switch, but may also be constituted by an optical sensor, for example.

Further, in this embodiment, the first and second container opposite portions 122L and 122R are provided with first and second full (state) sensors 8L and 8R as collected developer detecting means for detecting whether or not the first and second developer collecting containers 10L and 10R became full. In this embodiment, the first and second full sensors 8L and 8R are constituted by optical sensors for detecting a signal which is outputted to the controller 150 (FIG. 11) and which changes depending on a state of transmission or non-transmission of detection light. The controller 150 is capable of controlling the driving portion 5 on the basis of detection results of the first and second full sensors 8L and 8R. In this embodiment, each of the first and second full sensors 8L and 8R includes a light emitting (projecting) portion for emitting the detection light and a light receiving portion capable of receiving the detection light emitted from the light emitting portion. When the first and second developer collecting containers 10L and 10R are disposed at predetermined positions inside the apparatus main assembly 110, each of detection window portions (not shown) capable of permitting transmission of the detection light and provided on these containers is disposed between the emitting portion and the receiving portion. Inside the detection window portions, the collected developer enters when the collected developer in a predetermined (preset) amount corresponding to a full state is accommodated in the first and second developer collecting containers 10L and 10R. For that reason, in the case where the first and second developer collecting containers 10L and 10R become full with the collected developer, the detection light of each of the first and second full sensors 8L and 8R is blocked by the collected developer inside the detection window portion. By this, the controller 150 is capable of detecting that the first and second developer collecting containers 10L and 10R became full with the collected developer. Incidentally, the collected developer detecting means is not limited to the optical sensor, but may also be constituted by a weight sensor, for example.

Further, in this embodiment, the first and second container opposite portions 122L and 122R are provided with first and second locking members 9L and 9R, respectively, as retaining members for preventing inadvertent movement of the first and second developer collecting containers 10L and 10R in the dismounting direction. The first and second locking members 9L and 9R engage with engaging portions provided on the first and second developer collecting containers 10L and 10R, respectively, when the first and second developer collecting containers 10L and 10R are mounted at the predetermined positions inside the apparatus main assembly 110. Engagement of the first and second locking members 9L and 9R with the first and second developer collecting containers 10L and 10R is carried out for preventing inadvertent movement of the first and second developer collecting containers 10L and 10R principally due to the urging force of the above-described shutter urging springs. Accordingly, this engagement is capable of being easily released by a force exerted by the operator in order to move the first and second developer collecting containers 10L and 10R for the purpose of dismounting of these containers.

4. Control Mode 4-1. Constitution

FIG. 11 is a schematic block diagram showing a control mode of a principal part of the image forming apparatus 100 in this embodiment. In this embodiment, the apparatus main assembly 110 of the image forming apparatus 100 is provided with the controller 150. The controller 150 is constituted by including a CPU 151 as a calculation (process) control means which is a central element for performing arithmetic processing, a memory (storing medium) 152, such as a RAM or a ROM, as a storing means, and an input/output circuit (not shown) through which signals are inputted and outputted between the controller 150 and each of the respective portions, and the like means. In the RAM which is a rewritable memory, information inputted to the controller 150, detected information, a calculation result and the like are stored, and in the ROM, a data table acquired in advance and the like are stored. Between the CPU 151 and the memory 152 such as the RAM or the ROM, transfer and reading of data can be carried out.

To the controller 150, the respective portions of the image forming portion G are connected. Further, to the controller 150, the driving portion 5, the first and second driving portions 6L and 6R, the first and second container sensors 7L and 7R, the first and second full sensors 8L and 8R, and the like of the developer collecting device 1 are connected. Further, to the controller 150, an operating portion (operating panel) 130 provided on the image forming apparatus 100 is connected. The operating portion 130 includes a display portion (image display portion) such as a liquid crystal panel as a display means for displaying information by control of the controller 150, a voice outputting portion for outputting a voice indicating information, and an inputting portion such as keys as an inputting means for inputting information to the controller 150 by an operation by an operator such as a user or a service person. The operating portion 130 may be constituted by including a touch panel having functions of the display portion and the inputting portion. Further, to the controller 150, an image reading apparatus (not shown) provided in the image forming apparatus 100 or connected to the image forming apparatus 100 and an external device such as a personal computer connected to the image forming apparatus 100 may be connected.

The controller 150 carries out integrated control of the respective portions of the image forming portion G on the basis of an instruction and information from the operating portion 130 of the image forming apparatus 100 and the external device, so that the controller 150 can cause the image forming portion G to execute the image forming operation. Further, the controller 150 is capable of carrying out integrated control of the respective portions of the developer collecting device 1 so that the controller 150 causes the respective portions to execute a feeding operation of the collected developer to the first and second developer collecting containers 10L and 10R and an operation prompting the operator to exchange and mount the respective containers, and the like operation. The controller 150 can also be regarded as constituting a part of the developer collecting device 1.

4-2. Notifying Operation

A notifying operation for inducing exchange and mounting of each of the first and second developer collecting containers 10L and 10R will be described. In this embodiment, notification by the operating portion 130 as a notifying device with use of display, voice or both the display and voice, and notification by a light emitting portion as the notifying device will be described.

<Notification by Operating Portion (Display, Voice)>

FIG. 21 is a front view of the operating portion 130 of the image forming apparatus 100. The operating portion 130 includes an image display portion 131 for displaying an image on the basis of an instruction from the controller 150, and a voice outputting portion 132 for outputting a voice on the basis of the instruction from the controller 150.

In the case where dismounting of the first developer collecting container 10L is detected, the controller 150 causes the operating portion 130 to prompt the user (operator) to mount the first developer collecting container 10L in the first container mounting portion 119L by using voice or image display or both the voice and the image display. The controller 150 causes the image display portion 131 to prompt the user to mount an unmounted developer collecting container (the first developer collecting container 10L in this case) by using the above-described discrimination display portion (the first discrimination display portion 121L in this case) corresponding to the developer collecting container to be mounted (i.e., the unmounted developer collecting container). For example, the image display portion 131 displays a message that "PLEASE MOUNT LEFT CONTAINER (CONTAINER 1)". It is also possible to output a voice of the same contents as this by the voice outputting portion 132. By this, the user is notified of a position of the developer collecting container which should be mounted.

Incidentally, in place of the above-described notification or in combination therewith, the position and a mounting operation of the developer collecting container (the first developer collecting container 10L in this case) which should be mounted may also be displayed with moving images by the image display portion 131.

On the other hand, in the case where dismounting of the second developer collecting container 10R is detected, the controller 150 causes the operating portion 130 to prompt the user to mount the second developer collecting container 10R in the second container mounting portion 119R by using voice or image display or both the voice and the image display. The controller 150 causes the image display portion 131 to prompt the user to mount an unmounted developer collecting container (the second developer collecting container 10R in this case) by using the above-described discrimination display portion (the second discrimination display portion 121R in this case) corresponding to the developer collecting container to be mounted (i.e., the unmounted developer collecting container). For example, the image display portion 131 displays a message that "PLEASE MOUNT RIGHT CONTAINER (CONTAINER 2)". It is also possible to output a voice of the same contents as this by the voice outputting portion 132. By this, the user is notified of a position of the developer collecting container which should be mounted.

Incidentally, in place of the above-described notification or in combination therewith, the position and a mounting operation of the developer collecting container (the second developer collecting container 10R in this case) which should be mounted may also be displayed with moving images by the image display portion 131.

Further, in the case where detection that the first developer collecting container 10L becomes full is made, the controller 150 causes the operating portion 130 to prompt the user to exchange the first developer collecting container 10L by using the voice or the image display or both the voice and the image display. The controller 150 causes the image display portion 131 to prompt the user to exchange the developer collecting container by using the above-described discrimination display portion (the first discrimination display portion 121L in this case) corresponding to the developer collecting container which should be exchanged, i.e., the developer collecting container which becomes full. The image display portion 131 displays a message that "PLEASE EXCHANGE LEFT CONTAINER (CONTAINER 1)". It is also possible to output a voice of the same contents as this by the voice outputting portion 132.

By this, the user is notified of a position of the developer collecting container which should be exchanged. Incidentally, in place of the above-described notification or in combination therewith, the position and the mounting operation of the developer collecting container 10L may also be displayed with moving images by the image display portion 131. By doing so, it is possible to prevent erroneous dismounting of the container other than the container to be exchanged.

On the other hand, in the case where detection that the second developer collecting container 10R becomes full is made, the controller 150 causes the operating portion 130 to prompt the user to exchange the second developer collecting container 10R by using the voice or the image display or both the voice and the image display. The controller 150 causes the image display portion 131 to prompt the user to exchange the developer collecting container by using the above-described discrimination display portion (the second discrimination display portion 121R in this case) corresponding to the developer collecting container which should be exchanged, i.e., the developer collecting container which becomes full. For example, the image display portion 131 displays a message that "PLEASE EXCHANGE RIGHT CONTAINER (CONTAINER 2)". It is also possible to output a voice of the same contents as this by the voice outputting portion 132.

By this, the user is notified of a position of the developer collecting container which should be exchanged. Incidentally, in place of the above-described notification or in combination therewith, the position and the mounting operation of the developer collecting container 10R may also be displayed with moving images by the image display portion 131. By doing so, it is possible to provide notification for preventing erroneous dismounting of the container other than the container to be exchanged.

<Notification by Display of Light Emitting Portion>

FIG. 22 shows the first and second container mounting portions 119L and 119R of the image forming apparatus 100 and a peripheral portion thereof as viewed from the front side. The image forming apparatus 100 includes first and second light emitting portions 95L and 95R provided at positions close to (corresponding to) the first and second developer collecting containers 10L and 10R, respectively. In this embodiment, the first and second light emitting portions 95L and 95R are provided on a panel 123 facing the front side at positions adjacent to upper sides of the first and second container mounting portions 119L and 119R, respectively, in a range in which the first and second light emitting portions 95L and 95R at least partially overlap with the first and second container mounting portions 119L and 119R, respectively, with respect to the left-right direction. In the case dismounting of the first developer collecting container 10L is detected, the controller 150 causes the light emitting portion 95L to emit light and thus to prompt the user to mount the first developer collecting container 10L in the first container mounting portion 119L. At this time, the second light emitting portion 95R does not emit light.

On the other hand, in the case where dismounting of the second developer collecting container 10R is detected, the controller 150 causes the light emitting portion 95R to emit light and thus to prompt the user to mount the second developer collecting container 10R in the second container mounting portion 119R. At this time, the first light emitting portion 95L does not emit light.

Further, in the case where detection that the first developer collecting container 10L becomes full is made, the controller 150 causes the light emitting portion 95L to emit light so as to prompt the user to exchange the first developer collecting container 10L. At this time, the second light emitting portion 95R does not emit light. On the other hand, in the case where detection that the second developer collecting container 10R becomes full is made, the controller 150 causes the light emitting portion 95R to emit light so as to prompt the user to exchange the second developer collecting container 10R. At this time, the first light emitting portion 95L does not emit light.

Incidentally, in this embodiment, the notification by the light emitting portions 95L and 95R and by the operating portion 130 was described, but a constitution in which the notification is provided by either one of these portions may also be employed. Further, in this embodiment, the image forming apparatus 100 uses, as a common door, the exchanging door 118 for permitting exchange of the developer collecting containers 10L and 10R. On the other hand, in the case where the image forming apparatus 100 includes a plurality of exchanging doors corresponding to the developer collecting containers, respectively, by automatically opening the exchanging door corresponding to the developer collecting container to be exchanged (mounted), the user may also be notified of the position of the developer collecting container which should be exchanged (mounted).

5. Operation of Developer Collecting Device

Next, a feeding operation of the collected developer to the first and second developer collecting containers 10L and 10R by the developer collecting device 1 in this embodiment will be described. Here, an operation of the developer collecting device 1 when the collected developer is fed to each of the first and second developer collecting containers 10L and 10R will be described. A specific example of an operation sequence of the developer collecting device 1 including switch of a feeding destination of the collected developer will be described later.

A Table 1 is a summary of operation states of the driving portion 5 and the first and second collecting driving portions 6L and 6R in the feeding operation of the collected developer to each of the first and second developer collecting containers 10L and 10R in this embodiment. This operation is executed by controlling the driving portion 5 and the first and second collecting driving portions 6L and 6R by the controller 150 in accordance with programs stored in the memory 152.

TABLE 1

| FDC*1 | DPRD*2 | DOSCDP*36R | DOFCDP*46L |
|---|---|---|---|
| FC*510L | NORMAL | OFF | ON |
| SC*610R | REVERSE | ON | OFF |

*1"FDC" is a feeding destination container.
*2"DPRD" is a driving portion rotational direction.
*3"DOSCDP" is the drive of the second collecting driving portion.
*4"DOFCDP" is the drive of the first collecting driving portion.
*5"FC" is the first container.
*6"SC" is the second container.

<Feeding Operation to First Developer Collecting Container 10L>

FIG. 9 shows a flow of the collected developer in the case where the collected developer is fed to the first developer collecting container 10L provided on the left side. The first developer collecting container 1 sends the collected developer from the image forming portion G to the downstream feeding portion 4 through the upstream feeding portion 3 in the above-described manner. The collected developer sent to the downstream feeding portion 4 passes through the vertical pipe 41 and moves into the lateral pipe 42. When the collected developer is fed to the first developer collecting container 10L, the driving motor 51 of the driving portion 5 performs a normal rotation operation, and a driving force is transmitted from the driving portion 5 to the feeding screw 43 in the lateral pipe 42, so that the feeding screw 43 is rotated in the first direction. By this, the feeding screw 43 feeds the collected developer in the lateral pipe 42 in a direction from the right side toward the left side. At this time, in interrelation of the normal rotation operation of the driving motor 51 of the driving portion 5, not only the first collecting driving motor 61L (FIG. 7) of the first collecting driving portion 6L performs a rotation operation but also the second collecting driving motor 61R (FIG. 6) of the second collecting driving portion 6R is in a rest state.

By this, the collected developer fed in the lateral pipe 42 and sent to the first collecting pipe 44L by the feeding screw 43 and then is sent to the first developer collecting container 10L by being fed in the first collecting pipe 44L by the first collecting screw 45L. On the other hand, the collected developer sent from the vertical pipe 41 to the lateral pipe 42 is not fed in a direction from the left side toward the right side. Further, the collected developer is also not fed in the second collecting pipe 44R.

For that reason, in the case where the developer collecting device 1 feeds the collected developer to the first developer collecting container 10L during the operation (image formation) of the image forming apparatus 100, even when the second developer collecting container 10R is dismounted from the apparatus main assembly 110 for exchange, it is possible to suppress leakage and scattering of the collected developer from a periphery of the second developer collecting container 10R into the apparatus main assembly 110. That is, according to this embodiment, when the collected developer is fed to the first developer collecting container 10L, the collected developer sent from the image forming portion G does not pass through a feeding passage toward the second developer collecting container 10R. For that reason, even in the case where the second developer collecting container 10R is dismounted, it is possible to reduce a degree of a risk of leakage and scattering of the collected developer from the feeding passage toward the second developer collecting container 10R.

Incidentally, in this embodiment, the second collecting pipe 44R is provided with the second shutter member 46R, but by the risk-reducing effect of the leakage and scattering of the collected developer as described above, it is also possible to omit this shutter member and simplify a structure of the shutter member.

<Feeding Operation to Second Developer Collecting Container 10R>

FIG. 10 shows a flow of the collected developer in the case where the collected developer is fed to the second developer collecting container 10R provided on the right side. The first developer collecting container 1 sends the collected developer from the image forming portion G to the downstream feeding portion 4 through the upstream feeding portion 3 in the above-described manner. The collected developer sent to the downstream feeding portion 4 passes through the vertical pipe 41 and moves into the lateral pipe 42. When the collected developer is fed to the second developer collecting container 10R, the driving motor 51 of the driving portion 5 performs a reverse rotation operation, and a driving force is transmitted from the driving portion 5 to the feeding screw 43 in the lateral pipe 42, so that the feeding screw 43 is rotated in the first direction. By this, the feeding screw 43 feeds the collected developer in the lateral pipe 42 in a direction from the left side toward the right side. At this time, in interrelation of the reverse rotation operation of the driving motor 51 of the driving portion 5, not only the second collecting driving motor 61R (FIG. 6) of the second collecting driving portion 6R performs a rotation operation but also the first collecting driving motor 61L (FIG. 7) of the first collecting driving portion 6L is in a rest state.

By this, the collected developer fed in the lateral pipe 42 and sent to the second collecting pipe 44R by the feeding screw 43 and then is sent to the first developer collecting container 10L by being fed in the second collecting pipe 44R by the second collecting screw 45R. On the other hand, the collected developer sent from the vertical pipe 41 to the lateral pipe 42 is not fed in a direction from the right side toward the left side. Further, the collected developer is also not fed in the first collecting pipe 44L.

For that reason, in the case where the developer collecting device 1 feeds the collected developer to the second developer collecting container 10R during the operation (image formation) of the image forming apparatus 1, even when the first developer collecting container 10L is dismounted from the apparatus main assembly 110 for exchange, it is possible to suppress leakage and scattering of the collected developer from a periphery of the first developer collecting container 10L into the apparatus main assembly 110. That is, according to this embodiment, when the collected developer is fed to the second developer collecting container 10R, the collected developer sent from the image forming portion G does not pass through a feeding passage toward the first developer collecting container 10L. For that reason, even in the case where the second developer collecting container 10R is dismounted, it is possible to reduce a degree of a risk of leakage and scattering of the collected developer from the feeding passage toward the first developer collecting container 10L.

Incidentally, in this embodiment, the first collecting pipe 44L is provided with the first shutter member 46L, similarly as in the case of the above-described second shutter member 46R as described above, it is also possible to omit this shutter member and simplify a structure of the shutter member.

Thus, the developer collecting device 1 includes the controller 150 for controlling the driving portion 5 and the first and second collecting driving portions 6L and 6R. Further, when the feeding screw 43 is rotationally driven in the first direction by the driving portion 5, the controller 150 carries out control so that not only the first collecting screw 45L is rotationally driven by the first collecting driving portion 6L but also the second collecting screw 45R is rotationally driven by the second collecting driving portion 6R. Further, when the feeding screw 43 is rotationally driven in the second direction by the driving portion 5, the controller 150 carries out control so that not only the rotational drive of the first collecting screw 45L by the first collecting driving portion 6L is stopped but also the rotational drive of the second collecting screw 45R by the second collecting driving portion 6R is stopped.

6. Operation Sequence of Developer Collecting Device

Next, the specific example of a basis operation sequence of the developer collecting device 1 including the switching of the feeding destination of the collected developer in the developer collecting device 1 will be described. FIG. 12 is a flowchart showing an outline of the operation sequence. Here, for simplification, on the precondition that the first and second developer collecting containers 10L and 10R are disposed at predetermined positions inside the apparatus main assembly 110, an operation in which the feeding destination of the collected developer is switched during execution of a continuous image forming job will be described. Incidentally, the job is a series of operations for forming and outputting images on a single recording material P or a plurality of recording materials P by a single start instruction. Further, in the following, although description is omitted, the controller 150 also carries out control of the above-described first and second collecting driving portions 6L and 6R in interrelation with the control of the operation of the driving portion 5. Further, in the following, although description is omitted, the discharging screw 37 of the upstream feeding portion 3 is rotationally driven continuously during the image formation, and when the image forming operation is ended (or interrupted), the drive of the discharging screw 35 is stopped.

When the job is inputted and the image forming operation is started (S101), on the basis of the information stored in the memory 152, the controller 150 discriminates whether or not the feeding destination of the collected developer is the first developer collecting container 10L (S102). Incidentally, every switching of the feeding destination of the collected developer, the controller 150 causes the memory 152 to store information on a current feeding destination of the collected developer. In the case where the controller 150 discriminated in S102 that the current feeding destination of the collected developer is not the first developer collecting container 10L ("NO"), the sequence goes to a process of S112. Further, in the case where the controller 150 discriminated in S102 that the current feeding destination of the collected developer is the first developer collecting container 10L ("YES"), the controller 150 causes the driving motor 51 of the driving portion 5 to be normally rotated (normal rotation operation) (S103). Then, on the basis of a signal from the first full sensor 39L, the controller 150 discriminates whether or not the first developer collecting container 10L becomes full (whether or not the signal of the first full sensor 39L is "ON") (S104). In the case where the controller 150 discriminated in S104 that the first developer collecting container 10L does not become full ("NO"), the controller 150 causes the image forming portion G to continue the image forming operation (S105). Then, the controller 150 discriminates whether or not there is an image which has not yet outputted in the job (S106). Further, in the case where the controller 150 discriminated in S106 that the image which has not been yet outputted exists ("YES"), the sequence is returned to S104, and in the case where the controller 150 discriminated in S106 that there is no image which has not yet outputted ("NO"), the controller 150 causes the driving motor 51 of the driving portion 5 to stop the drive thereof (S107). Then, the controller 150 ends the image forming operation and thus sends the job (S108). Further, in the case where the controller 150 discriminated in S104 that the first developer collecting container 10L becomes full ("YES"), on the basis of a signal from the second full sensor 8R, the controller 150 discriminates whether or not the second developer collecting container 10R becomes full (whether or not the signal of the second full sensor 8R is "ON") (S109).

In the case where the controller 150 discriminated in S109 that the second developer collecting container 10R becomes full ("YES"), the controller 150 causes the driving motor 51 of the driving portion 5 to stop (S110). Then, the controller 150 causes the image forming operation to interrupt (S111). In S111, the controller 150 is capable of causing the operating portion 130 (or a display portion or the like of the external device) to display a message for notifying the operator of a full state of both the first and second developer collecting containers 10L and 10R.

On the other hand, in the case where the controller 150 discriminated in S109 that the second developer collecting container 10R does not become full ("NO"), the controller 150 switches a rotational direction of the driving motor of the driving portion 5 and causes the driving motor 51 to be reversely rotated (reverse rotation operation) (S112). By this, the feeding destination of the collected developer is switched from the first developer collecting container 10L to the second developer collecting container 10R. Incidentally, also in the case where the controller 150 discriminated in S102 that the current feeding destination of the collected developer is not the first developer collecting container 10L ("NO"), the controller 150 causes the driving motor of the driving portion 5 to be reversely rotated (reverse rotation operation) (S112). Then, on the basis of a signal from the second full sensor 8R, the controller 150 discriminates whether or not the second developer collecting container 10R becomes full (whether or not the signal of the second full sensor 8R is "ON") (S113). In the case where the controller 150 discriminated in S113 that the first developer collecting container 10L does not become full ("NO"), the controller 150 causes the image forming portion G to continue the image forming operation (S114). Then, the controller 150 discriminates whether or not there is an image which has not yet outputted in the job (S115), and in the case where the controller 150 discriminated in S115 that the image which has not been yet outputted exists ("YES"), the sequence is returned to S113, and in the case where the controller 150 discriminated in S115 that there is no image which has not yet outputted ("NO"), the controller 150 causes the driving motor 51 of the driving portion 5 to stop the drive thereof (S116). Then, the controller 150 ends the image forming operation and thus sends the job (S117). Further, in the case where the controller 150 discriminated in S113 that the second developer collecting container 10R becomes full ("YES"), on the basis of a signal from the first full sensor 8L, the controller 150 discriminates whether or not the first developer collecting container 10L becomes full (whether or not the signal of the first full sensor 8L is "ON") (S118). In the case where the controller 150 discriminated in S118 that the first developer collecting container 10L does not become full ("NO"), the sequence goes to S103. That is, the controller 150 switches the rotational direction of the driving motor 51 of the driving portion 5 and thus causes the driving motor to be normally rotated (normal rotation operation), so that the feeding destination of the collected developer is switched from the second developer collecting container 10R to the first developer collecting container 10L. Further, in the case where the controller 150 discriminated in S118 that the second developer collecting container 10R becomes full ("YES"), the controller 150 causes the driving motor 51 of the driving portion 5 to stop (S119). Then, the controller 150 causes the image forming operation to interrupt (S120). In S120, the controller 150 is capable of causing the operating portion 130 (or a display portion or the like of the external device) to display a message for notifying the operator of a full state of both the first and second developer collecting containers 10L and 10R.

Further, in the case where the container which is the feeding destination of the collected developer is switched by switching the rotational direction of the driving motor 51 of the driving portion 5 in S112 and S103, the controller 150 is capable of carrying out the following control. That is, the controller 150 can cause the operating portion 130 (or the display portion or the like of the external device) to display a message notifying (prompting) the operator of that there is a need to exchange the container which became full. At this time, the notification is not required to be made immediately during the image formation, but may also be made after the end of the job.

Further, after the end of the job, the developer collecting device 1 is operated so as to feed the collected developer toward the container which becomes full, and for example, the collected developer remaining on the collecting pipe 44 corresponding to the container which becomes full may also be fed to the container. By this, it is possible to suppress that the collected developer in the collecting pipe 44 is then left standing and is agglomerated or the like.

Incidentally, in this embodiment, although description was omitted for simplification, the controller 150 is capable of controlling the image forming operation and the operation of the developer collecting device 1 on the basis of the signals from the first and second container sensors 7L and 7R. For example, when the instruction to start the job is provided, in the case where the controller 150 discriminated that both the first and second developer collecting containers are not mounted, the controller 150 is capable of controlling the image forming portion G so as not to start the image forming operation. Further, for example, when a full state of either one of the first and second developer collecting containers 10L and 10R is detected, in the case where detection that the other container is not mounted is made, the controller 150 is capable of controlling the image forming position S so as to interrupt the image forming operation. In either case, the controller 150 can cause the operating portion 130 (or the display portion or the like of the external device) to display a message prompting the operator to mount the corresponding container. A specific example will be further described later.

Thus, in this embodiment, in the case where one of the first and second developer collecting containers 10L and 10R became full, the feeding destination of the collected developer is switched to the other container, so that the first and second developer collecting containers 10L and 10R are used alternately. By this, even when one container becomes full during the image forming operation, the container can be exchanged without stopping the image forming operation. Further, according to this embodiment, even in the case where one container is exchanged during the image forming operation as described above, it is possible to suppress the leakage and the scattering of the collected developer from a periphery of the container into the apparatus main assembly 110.

7. Operation in Case that Developer Collecting Container to which Collected Developer is Fed Next, an operation of the developer collecting device 1 in this embodiment in the case where the developer collecting containers 10L and 10R to which the collected developer is fed during the image forming operation will be described. In this embodiment, the operation of the developer collecting device 1 in the case where each of the first developer collecting container 10L and the second developer collecting container 10R, which is a current feeding destination of the collected developer is dismounted during the image forming operation will be described. This operation is executed by controlling the driving portion 5 and the first and second collecting driving portions 6L and 6R in accordance with a program stored in the memory 152, by the controller 150. Incidentally, a specific example of an operation sequence including processes such as continuation and interruption of the image forming operation will be described later.

<Case that First Developer Collecting Container 10L to which Collected Developer is Fed is Dismounted>

In the case where the collected developer is fed to the left-side first developer collecting container 10L during the image forming operation, the driving motor 51 of the driving portion 5 performs normal rotation operation (FIG. 9, table 1). Further, the first collecting driving motor 61L of the first collecting driving portion 6L is in operation (FIG. 9, table 1). Further, the second collecting driving motor 61R of the second collecting driving portion 96R is at rest (FIG. 9, table 1).

At this time, when the first developer collecting container 10L is dismounted, dismounting of this container is detected by the first container sensor 7L. Then, the rotation operation is the driving motor 51 of the driving portion 5 is switched from the normal rotation operation to a reverse rotation operation. Further, in interrelation with this switching of the rotation operation of the driving motor 51 of the driving portion 5, the operation of the first collecting driving motor 61L of the first collecting driving portion 6L is stopped. Further, in interrelation with the switching of the rotation operation of the driving motor 51 of the driving portion 5, the operation of the second collecting driving motor 61R of the second collecting driving portion 6R is started. Further, in this embodiment, when the first developer collecting container 10L is dismounted, the first shutter member 46L is closed.

By this, even when the first developer collecting container 10L to which the collected developer is fed during the image formation is dismounted, the collected developer sent from the vertical pipe 41 to the lateral pipe 42 is not fed in a direction from the right side toward the left side in the lateral pipe 42. Further, the collected developer is also not fed in the first collecting pipe 44L. For that reason, even when the image forming operation is not stopped, it is possible to suppress leakage and scattering of the collected developer into the apparatus main assembly 110 through the first collecting discharging opening 44*b*L. As described above, in order to prevent that the developer collecting container to which the collected developer is fed during the image forming operation, it would be considered that a locking means and a door are provided for each of the containers. According to this embodiment, without providing these means, by a simple constitution, it is possible to suppress the leakage and scattering of the collected developer through the first collecting discharging opening 44*b*L without stopping the image forming operation.

Further, in this embodiment, when the first developer collecting container 10L is dismounted, the first collecting discharging opening 44*b*L is sealed (closed) by the first shutter member 46L. For that reason, the leakage and the scattering of the collected developer through the first collecting discharging opening 44*b*L can be further suppressed. However, by a suppressing effect of the leakage and the scattering of the collected developer through the above-described switching of the feeding direction of the collected developer, it is also possible to realize omission of the first shutter member 46L and simplification of a structure thereof.

<Case that Second Developer Collecting Container 10R to which Collected Developer is Fed is Dismounted>

In the case where the collected developer is fed to the right-side second developer collecting container 10R during the image forming operation, the driving motor 51 of the driving portion 5 performs reverse rotation operation (FIG. 10, table 1). Further, the second collecting driving motor 61R of the second collecting driving portion 6R is in operation (FIG. 10, table 1). Further, the first collecting driving motor 61L of the first collecting driving portion 96L is at rest (FIG. 10, table 1).

At this time, when the second developer collecting container 10R is dismounted, dismounting of this container is detected by the second container sensor 7R. Then, the rotation operation is the driving motor 51 of the driving portion 5 is switched from the reverse rotation operation to the normal rotation operation. Further, in interrelation with this switching of the rotation operation of the driving motor 51 of the driving portion 5, the operation of the second collecting driving motor 61R of the second collecting driving portion 6R is stopped. Further, in interrelation with the switching of the rotation operation of the driving motor 51 of the driving portion 5, the operation of the first collecting driving motor 61L of the first collecting driving portion 6L is started. Further, in this embodiment, when the second developer collecting container 10R is dismounted, the second shutter member 46R is closed.

By this, even when the second developer collecting container 10R to which the collected developer is fed during the image formation is dismounted, the collected developer sent from the vertical pipe 41 to the lateral pipe 42 is not fed in a direction from the left side toward the right side in the lateral pipe 42. Further, the collected developer is also not fed in the second collecting pipe 44R. For that reason, even when the image forming operation is not stopped, it is possible to suppress leakage and scattering of the collected developer into the apparatus main assembly 110 through the second collecting discharging opening 44*b*R. As described above, in order to prevent that the developer collecting container to which the collected developer is fed during the image forming operation, it would be considered that a locking means and a door are provided for each of the containers. According to this embodiment, without providing these means, by a simple constitution, it is possible to suppress the leakage and scattering of the collected developer through the second collecting discharging opening 44*b*R without stopping the image forming operation.

Further, in this embodiment, when the second developer collecting container 10R is dismounted, the second collecting discharging opening 44*b*R is sealed (closed) by the second shutter member 46R. For that reason, the leakage and the scattering of the collected developer through the second collecting discharging opening 44*b*R can be further suppressed. However, by a suppressing effect of the leakage and the scattering of the collected developer through the above-described switching of the feeding direction of the collected developer, it is also possible to realize omission of the second shutter member 46R and simplification of a structure thereof <Operation Procedure>

Next, an example of an operation in the case where the developer collecting containers 10L and 10R to which the collected developer is fed during the image forming operation will be described. FIG. 13 is a flowchart showing an outline of a procedure of this operation. In this embodiment, description will be made by paying attention to a switch operation of the collected developer feeding direction in which dismounting of the developer collecting containers 10L and 10R to which the collected developer is fed during the image forming operation acts as a trigger. Incidentally, although description is omitted in the following, the discharging screw 37 of the upstream feeding portion 3 is rotationally driven continuously during the image forming operation, and the rotational drive thereof is stopped when the image forming operation ends (or interrupts).

During the image forming operation, the controller 150 detects, on the basis of a signal from either one of the first and second container sensors 7L and 7R, that either one of the first and second developer collecting container 10L and 10R to which the collected developer is fed is dismounted (S201). Then, the controller 150 discriminates whether or not the dismounted container is the first developer collecting container 10L (S202). In the case where the controller 150 discriminated in S202 that the dismounted container is the first developer collecting container 10L which is a feeding destination of the current collected developer ("YES"), the following discrimination is made. That is, on the basis of the signal from the second container sensor 7R, the controller 150 discriminates whether or not the second developer collecting container 10R is mounted (whether or not the signal from the second container sensor 7R is ON) (S203). In the case where the controller 150 discriminated in S203 that the second developer collecting container 10R is mounted ("YES"), the following discrimination is made. That is, on the basis of the signal from the second full sensor 8R, the controller 150 discriminates whether or not the second developer collecting container 10R becomes full (whether or not the signal from the second full sensor 8R is ON) (S204). In the case where the controller 150 discriminated in S204 that the second developer collecting container 10R does not become full ("NO"), the controller 150 switches the rotational direction of the driving motor 51 of the driving portion 5 and thus causes the driving motor 51 to perform the reverse rotation operation (S205). Then, the controller 150 ends the switching operation of the collected developer feeding direction due to the dismounting of the first developer collecting container 10L to which the collected developer is fed (S206). Further, in the case where the controller 150 discriminated in S203 that the second developer collecting container 10R is not mounted ("NO") or in the case where the controller 150 discriminated in S204 that the second developer collecting container 10R becomes full ("YES"), the controller 150 causes the driving motor 51 of the prompting portion 5 to stop (S207). Further, the controller 150 interrupts the image forming operation (S208). In S208, the controller 150 is capable of carrying out display or the like prompting mounting of at least one of the first and second developer collecting containers 10L and 10R capable of collecting the collected developer in the operation portion 130 (or in a display portion or the like of an external device).

On the other hand, in the case where the controller 150 discriminated in S202 that the dismounted container is the second developer collecting container 10R which is a feeding destination of the current collected developer ("NO"), the following discrimination is made. That is, on the basis of the signal from the first container sensor 7L, the controller 150 discriminates whether or not the first developer collecting container 10L is mounted (whether or not the signal from the first container sensor 7L is ON) (S209). In the case where the controller 150 discriminated in S209 that the first developer collecting container 10L is mounted ("YES"), the following discrimination is made. That is, on the basis of the signal from the first full sensor 8L, the controller 150 discriminates whether or not the first developer collecting container 10L becomes full (whether or not the signal from the second full sensor 8R is ON) (S210). In the case where the controller 150 discriminated in S210 that the second developer collecting container 10R does not become full ("NO"), the controller 150 switches the rotational direction of the driving motor 51 of the driving portion 5 and thus causes the driving motor 51 to perform the normal rotation operation (S211). Then, the controller 150 ends the switching operation of the collected developer feeding direction due to the dismounting of the first developer collecting container 10L to which the collected developer is fed (S212). Further, in the case where the controller 150 discriminated in S209 that the first developer collecting container 10L is not mounted ("NO") or in the case where the controller 150 discriminated in S210 that the first developer collecting container 10L becomes full ("YES"), the controller 150 causes the driving motor 51 of the prompting portion 5 to stop (S213). Further, the controller 150 interrupts the image forming operation (S214). In S214, the controller 150 is capable of carrying out display or the like prompting mounting of at least one of the first and second developer collecting containers 10L and 10R capable of collecting the collected developer in the operation portion 130 (or in a display portion or the like of an external device).

8. Operation Sequence of Developer Collecting Device Including Container Presence or Absence Detection Next, a specific example of an operation sequence of the developer collecting device 1 during a continuous image forming operation, in which the switching operation of the collected developer feeding direction due to the dismounting of the developer collecting container 10L and 10R as described above is incorporated. FIG. 14 is a flowchart showing an outline of the procedure of the operation sequence. Incidentally, in the following, although description is omitted, the controller 150 also carries out control of the operations of the first and second collecting driving portions 6L and 6R as described above in interrelation with control of the operation of the driving portion 5 (see table 1). Further, in the following, although description is omitted, the discharging screw 37 of the upstream feeding portion 3 is rotationally driven continuously during the image forming operation, and the rotational drive thereof is stopped when the image forming operation is ended (interrupted).

In the procedure of FIG. 14, processes similar to the processes of the procedure of FIG. 12 are represented by the same step numbers (S101 to S120). The procedure of FIG. 14 includes processes S301 to S304 in addition to the processes (S101 to S120) in the procedure of FIG. 12. In this embodiment, the description as the processes explained with reference to FIG. 12 will be appropriately omitted and the processes added in the procedure of FIG. 14 will be principally described.

When the controller 150 causes the driving motor 51 of the driving portion 5 to perform the normal rotation operation in S103, on the basis of the signal from the first container sensor 7L, the controller 150 discriminates whether or not the first developer collecting container 10L is mounted (whether or not the signal from the first container sensor 7L is ON) (S301). This discrimination can be made substantially simultaneous with a start of the normal rotation operation of the driving motor 51 or before the normal rotation operation is started in actuality after execution of the normal rotation operation of the driving motor 51 is determined. In the case where the controller 150 discriminated in S301 that the first developer collecting container 10L is mounted ("YES"), the procedure goes to the process of S104. On the other hand, in the case where the controller 150 discriminated in S301 that the first developer collecting container 10L is not mounted ("NO"), the following discrimination is made. That is, on the basis of the signal from the second container sensor 7R, the controller 150 discriminates whether or not the second developer collecting container 10R is mounted (whether or not the signal from the second container sensor 7R is ON) (S302). In the case where the controller 150 discriminated in S302 that the second developer collecting container 10R is mounted ("YES"), the procedure goes to S109. That is, in this case, as described above, in the case where the second developer collecting container 10R does not become full, the description of the collected developer is switched from the first developer collecting container 10L to the second developer collecting container 10R. On the other hand, in the case where the controller 150 discriminated in S302 that the second developer collecting container 10R is not mounted ("NO"), the procedure goes to the process of S110. That is, in this case, as described above, the image forming operation is interrupted. Incidentally, in S111, the controller 150 is capable of carrying out display or the like prompting mounting of at least one of the first and second developer collecting containers 10L and 10R capable of collecting the collected developer in the operating portion 130 (or in the display portion or the like of the external device).

Further, when the controller 150 causes the driving motor 51 of the driving portion 5 to perform the reverse rotation operation in S112, on the basis of the signal from the second container sensor 7R, the controller 150 discriminates whether or not the second developer collecting container 10R is mounted (whether or not the signal from the second container sensor 7R is ON) (S303). This discrimination can be made substantially simultaneous with a start of the reverse rotation operation of the driving motor 51 or before the reverse rotation operation is started in actuality after execution of the reverse rotation operation of the driving motor 51 is determined. In the case where the controller 150 discriminated in S303 that the second developer collecting container 10R is mounted ("YES"), the procedure goes to the process of S113. On the other hand, in the case where the controller 150 discriminated in S303 that the second developer collecting container 10R is not mounted ("NO"), the following discrimination is made. That is, on the basis of the signal from the first container sensor 7L, the controller 150 discriminates whether or not the first developer collecting container 10L is mounted (whether or not the signal from the first container sensor 7L is ON) (S304). In the case where the controller 150 discriminated in S304 that the first developer collecting container 10L is mounted ("YES"), the procedure goes to S118. That is, in this case, as described above, in the case where the first developer collecting container 10L does not become full, the description of the collected developer is switched from the second developer collecting container 10R to the first developer collecting container 10L. On the other hand, in the case where the controller 150 discriminated in S304 that the second developer collecting container 10R is not mounted ("NO"), the procedure goes to the process of S119. That is, in this case, as described above, the image forming operation is interrupted. Incidentally, in S120, the controller 150 is capable of carrying out display or the like prompting mounting of at least one of the first and second developer collecting containers 10L and 10R capable of collecting the collected developer in the operating portion 130 (or in the display portion or the like of the external device).

9. Developer Collecting Device Operation Sequence Including Notifying Operation

Next, several examples of an operation sequence of the developer collecting device 1 including the above-described notifying operation will be described.

FIG. 23 is a flowchart showing the example of the operation sequence of the developer collecting device 1 in which procedure of the notifying operation is incorporated in the procedure of FIG. 12. In the procedure of FIG. 23, processes similar to the processes of the procedure of FIG. 12 are represented by the same step numbers or symbols (S101 to S120). The procedure of FIG. 23 includes processes S401 to S404 in addition to the processes (S101 to S120) in the processes of the procedure of FIG. 12. In this example, the processes described with reference to FIG. 12 will be appropriately omitted from description, and the processes added in the procedure of the procedure of FIG. 23 will be principally described.

In the case where the controller 150 discriminated in S104 that the first developer collecting container 10L becomes full, the controller 150 performs the notifying operation prompting the user to exchange the first developer collecting container 10L (S401). Then, the controller 150 proceeds to the process S109. Further, in the case where the controller 150 discriminated in S109 that the second developer collecting container 10R becomes full, the controller 150 performs the notifying operation prompting the user to exchange the second developer collecting container 10R (S402). Then, the controller 150 proceeds to the process S110. Further, in the case where the controller 150 discriminated in S113 that the second developer collecting container 10R becomes full, the controller 150 performs the notifying operation prompting the user to exchange the second developer collecting container 10R (S403). Then, the controller 150 proceeds to the process S118. Further, in the case where the controller 150 discriminated in S118 that the first developer collecting container 10L becomes full, the controller 150 performs the notifying operation prompting the user to exchange the first developer collecting container 10L (S404). Then, the controller 150 proceeds to the process S119.

FIG. 24 is a flowchart showing the example of the operation sequence of the developer collecting device 1 in which procedure of the notifying operation is incorporated in the procedure of FIG. 13. In the procedure of FIG. 24, processes similar to the processes of the procedure of FIG. 13 are represented by the same step numbers or symbols (S201 to S214). The procedure of FIG. 24 includes processes S501 to S510 in addition to the processes (S201 to S214) in the processes of the procedure of FIG. 13. In this example, the processes described with reference to FIG. 13 will be appropriately omitted from description, and the processes added in the procedure of the procedure of FIG. 24 will be principally described.

In the case where the controller 150 discriminated in S202 that the dismounted container is the first developer collecting container 10L, the controller 150 performs the notifying operation prompting the user to mount the first developer collecting container 10L (S501). Then, the controller 150 proceeds to the process S203. Further, in the case where the controller 150 discriminated in S204 that the second developer collecting container 10R becomes full, the controller 150 performs the notifying operation prompting the user to exchange the second developer collecting container 10R (S502). Then, the controller 150 causes the driving motor 51 of the driving portion 5 to stop the drive thereof (S503), and interrupts the image forming operation (S504). Further, in the case where the controller 150 discriminated in S203 that the second developer collecting container 10R is not mounted, the controller 150 performs the notifying operation prompting the user to mount the second developer collecting container 10R (S505). Then, the controller 150 proceeds to the process S207. Further, in the case where the controller 150 discriminated in S202 that the dismounted container is the second developer collecting container 10R, the controller 150 performs the notifying operation prompting the user to mount the second developer collecting container 10R (S506). Then, the controller 150 proceeds to the process S209. Further, in the case where the controller 150 discriminated in S210 that the first developer collecting container 10L becomes full, the controller 150 performs the notifying operation prompting the user to exchange the first developer collecting container 10L (S507). Then, the controller 150 causes the driving motor 51 of the driving portion 5 to stop the drive thereof (S508), and interrupts the image forming operation (S509). Further, in the case where the controller 150 discriminated in S209 that the first developer collecting container 10L is not mounted, the controller 150 performs the notifying operation prompting the user to mount the first developer collecting container 10L (S510). Then, the controller 150 proceeds to the process S213.

FIG. 25 is a flowchart showing the example of the operation sequence of the developer collecting device 1 in which procedure of the notifying operation is incorporated in the procedure of FIG. 14. In the procedure of FIG. 25, processes similar to the processes of the procedure of FIG. 14 are represented by the same step numbers or symbols (S101 to S120 and S301 to S304). The procedure of FIG. 25 includes processes S601 to S612 in addition to the processes (S101 to S120 and S301 to S304) in the processes of the procedure of FIG. 14. In this example, the processes described with reference to FIG. 14 will be appropriately omitted from description, and the processes added in the procedure of the procedure of FIG. 25 will be principally described.

In the case where the controller 150 discriminated in S301 that the first developer collecting container 10L is not mounted, the controller 150 performs the notifying operation prompting the user to mount the first developer collecting container 10L (S601). Then, the controller 150 proceeds to the process S302. Further, in the case where the controller 150 discriminated in S104 that the first developer collecting container 10L becomes full, the controller 150 performs the notifying operation prompting the user to exchange the first developer collecting container 10L (S602). Then, the controller 150 proceeds to the process S302. Further, in the case where the controller 150 discriminated in S302 that the second developer collecting container 10R becomes full, the controller 150 performs the notifying operation prompting the user to exchange the second developer collecting container 10R (S603). Then, the controller 150 causes the driving motor 51 of the driving portion 5 to stop the drive thereof (S604), and interrupts the image forming operation (S605). Further, in the case where the controller 150 discriminated in S109 that the second developer collecting container 10R becomes full, the controller 150 performs the notifying operation prompting the user to exchange the second developer collecting container 10R (S606). Then, the controller 150 proceeds to the process S110. Further, in the case where the controller 150 discriminated in S303 that the second developer collecting container 10R is not mounted, the controller 150 performs the notifying operation prompting the user to mount the second developer collecting container 10R (S607). Then, the controller 150 proceeds to the process S304. Further, in the case where the controller 150 discriminated in S113 that the second developer collecting container 10R becomes full, the controller 150 performs the notifying operation prompting the user to exchange the second developer collecting container 10R (S608). Then, the controller 150 proceeds to the process S304. Further, in the case where the controller 150 discriminated in S304 that the first developer collecting container 10L is not mounted, the controller 150 performs the notifying operation prompting the user to mount the first developer collecting container 10L (S609). Then, the controller 150 causes the driving motor 51 of the driving portion 5 to stop the drive thereof (S610), and interrupts the image forming operation (S611). Further, in the case where the controller 150 discriminated in S118 that the first developer collecting container 10L becomes full, the controller 150 performs the notifying operation prompting the user to exchange the first developer collecting container 10L (S612). Then, the controller 150 proceeds to the process S119.

As described above, according to this embodiment, in the constitution advantageous in simplification of the device structure and in downsizing of the device, it is possible to suppress the leakage and the scattering of the collected developer in the case where the developer collecting container to which the collected developer is fed is dismounted.

Embodiment 2

Then, another embodiment of the present invention will be described. Basic constitution of the developer collecting device 1 and the image forming apparatus 100 are the same as those in the embodiment 1. In the developer collecting device 1 and the image forming apparatus 100 in this embodiment, elements having the same or corresponding functions and constitutions as those in the embodiment 1 are represented by the same reference numerals or symbols as those in the embodiment 1 and will be omitted from description.

1. Developer Collecting Device

In the embodiment 1, the developer collecting device 1 was constituted so that the first and second collecting screws 45L and 45R are rotationally driven by the driving portions (driving sources) other than the feeding screw 43. On the other hand, in this embodiment, the first and second collecting screws 45L and 45R can be rotationally driven by transmission of a driving force to the feeding screw 43.

FIG. 15 is a perspective view of the developer collecting device 1 in this embodiment as viewed from an obliquely front side (in which the first and second developer collecting containers 10L and 10R connected to the developer collecting device 1 are also shown). Further, FIG. 16 is a sectional view of the developer collecting device 1 in this embodiment shown in FIG. 15 similarly taken along the X-X line of FIG. 4. FIG. 17 is a sectional view of the developer collecting device 1 in this embodiment shown in FIG. 15 similarly taken along the Y-Y line of FIG. 4. FIG. 18 is a perspective view of a part of the developer collecting device 1 in this embodiment as viewed from an obliquely rear side and in which a drive transmission path to the first and second collecting screws 45L and 45R is shown.

As shown in FIGS. 15 and 18, the feeding screw 43 is rotationally driven by transmission of a rotational driving force from the driving portion 5 thereto. In this embodiment, the driving portion 5 is constituted by including the driving motor 51 as a driving source and the driving train (single or plurality of gears or the like) 52 for transmitting the driving force from the driving motor 51 to the feeding screw 43. In this embodiment, the driving source (driving motor) 51 is disposed at a left side-end portion of the lateral pipe 42, and the driving train 52 is connected to the left side-end portion of the feeding screw 43.

Further, as shown in FIGS. 15 and 18, linear first and second shaft portions 43*a* and 43*b* formed at (or connected to) left side- and right side-end portions of the feeding screw 43 with respect to the rotational axis direction extend to an outside of the lateral pipe 42. Further, first and second drive transmitting portions 20L and 20R are provided so as to be capable of being drive-connected to the first and second shaft portions 43*a* and 43*b*, respectively. In this embodiment, the first drive transmitting portion 20L is constituted by including a first one-way clutch gear 21L as a driving force blocking member and a first collecting driving train (single or plurality of gears or the like) 22L. The first one-way clutch gear 21L is disposed on the first shaft portion 43*a* of the feeding screw 43 so as to be capable of drive transmission and is constituted by press-fitting a one-way clutch to an inner diameter portion thereof. Further, the first collecting driving train 22L is constituted so that a rotational driving force from the first one-way clutch gear 21L is transmitted to the first collecting screw 45L. Incidentally, in this embodiment, the first collecting driving train 22L is constituted so as to transmit the drive also to the first coupling 63L. Similarly, in this embodiment, the second drive transmitting portion 20R is constituted by including a second one-way clutch gear 21R as a driving force blocking member and a second collecting driving train (single or plurality of gears or the like) 22R. The second one-way clutch gear 21R is disposed on the second shaft portion 43*b* of the feeding screw 43 so as to be capable of drive transmission and is constituted by press-fitting a one-way clutch to an inner diameter portion thereof. Further, the second collecting driving train 22R is constituted so that a rotational driving force from the second one-way clutch gear 21R is transmitted to the second collecting screw 45R. Incidentally, in this embodiment, the second collecting driving train 22R is constituted so as to transmit the drive also to the second coupling 63R.

The first one-way clutch gear 21L is constituted so that when the feeding screw 43 is rotated in the first direction (the direction in which the collected developer is fed toward the first developer collecting container 10L), the first one-way clutch gear 21L is rotated together and transmits the driving force to a downstream side. Further, the second one-way clutch gear 21R is constituted so that the feeding screw 43 is rotated in the second direction (the direction in which the collected developer is fed toward the second developer collecting container 10R), the second one-way clutch gear 21R is rotated together and transmits the driving force to the downstream side.

2. Operation of Developer Collecting Device

Next, a feeding operation of the collected developer to the first and second developer collecting containers 10L and 10R by the developer collecting device 1 in this embodiment will be described. Here, a portion different from the embodiment 1 will be principally described. A Table 2 is a summary of operation states of the driving portion 5 and the first and second collecting screws 45L and 45R in the feeding operation of the collected developer to each of the first and second developer collecting containers 10L and 10R in this embodiment. This operation is executed by controlling the driving portion 5 by the controller 150 in accordance with programs stored in the memory 152.

TABLE 2

| FDC*[1] | DPRD*[2] | ROSCDP*[3]6R | ROFCDP*[4]6L |
|---|---|---|---|
| FC*[5]10L | NORMAL | STOP | OPERATION |
| SC*[6]10R | REVERSE | OPERATION | STOP |

*[1]"FDC" is a feeding destination container.
*[2]"DPRD" is a driving portion rotational direction.
*[3]"ROSCDP" is the rotation of the second collecting driving portion.
*[4]"ROFCDP" is the rotation of the first collecting driving portion.
*[5]"FC" is the first container.
*[6]"SC" is the second container.

<Feeding Operation to First Developer Collecting Container 10L>

FIG. 19 shows a flow of the collected developer in the case where the collected developer is fed to the first developer collecting container 10L provided on the left side. In this embodiment, when the collected developer is fed to the first developer collecting container 10L, in synchronism with rotation of the feeding screw 43 in the first direction by the normal rotation operation of the driving motor 51 of the driving portion 5, the first one-way clutch gear 21L is rotated in a drive transmitting direction. Then, the driving force is transmitted from the first one-way clutch gear 21L to the first collecting driving train 22L, so that the first collecting screw 45L is rotated. On the other hand, the second one-way clutch gear 21R interrupts the drive and thus does not transmit the driving force to the second collecting driving train 22R, and therefore, the second collecting screw 45R is kept at rest.

By this, the collected developer fed in the lateral pipe 42 and sent to the first collecting pipe 44L by the feeding screw 43 and then is sent to the first developer collecting container 10L by being fed in the first collecting pipe 44L by the first collecting screw 45L. On the other hand, the collected developer sent from the vertical pipe 41 to the lateral pipe 42 is not fed in a direction from the left side toward the right side. Further, the collected developer is also not fed in the second collecting pipe 44R.

For that reason, in the case where the developer collecting device 1 feeds the collected developer to the first developer collecting container 10L during the operation of the image forming apparatus 1, even when the second developer collecting container 10R is dismounted from the apparatus main assembly 110 for exchange, it is possible to suppress leakage and scattering of the collected developer from a periphery of the second developer collecting container 10R into the apparatus main assembly 110.

<Feeding Operation to Second Developer Collecting Container 10R>

FIG. 20 shows a flow of the collected developer in the case where the collected developer is fed to the second developer collecting container 10R provided on the right side. In this embodiment, when the collected developer is fed to the first developer collecting container 10R, in synchronism with rotation of the feeding screw 43 in the second direction by the reverse rotation operation of the driving motor 51 of the driving portion 5, the second one-way clutch gear 21R is rotated in a drive transmitting direction. Then, the driving force is transmitted from the second one-way clutch gear 21R to the second collecting driving train 22R, so that the second collecting screw 45R is rotated. On the other hand, the first one-way clutch gear 21L interrupts the drive and thus does not transmit the driving force to the first collecting driving train 22L, and therefore, the first collecting screw 45L is kept at rest.

By this, the collected developer fed in the lateral pipe 42 is sent to the second collecting pipe 44R by the feeding screw 43 and then is sent to the second developer collecting container 10R by being fed in the second collecting pipe 44R by the second collecting screw 45R. On the other hand, the collected developer sent from the vertical pipe 41 to the lateral pipe 42 is not fed in a direction from the right side toward the right side. Further, the collected developer is also not fed in the first collecting pipe 44L.

For that reason, in the case where the developer collecting device 1 feeds the collected developer to the second developer collecting container 10R during the operation of the image forming apparatus 1, even when the first developer collecting container 10L is dismounted from the apparatus main assembly 110 for exchange, it is possible to suppress leakage and scattering of the collected developer from a periphery of the first developer collecting container 10L into the apparatus main assembly 110.

Thus, in this embodiment, the developer collecting device 1 includes the first drive transmitting portion 20L capable of not only transmitting the driving force, transmitted from the driving portion 5 to the feeding screw 43, to the first collecting screw 45L but also interrupting transmission of the driving force. Further, this developer collecting device 1 includes the second drive transmitting portion 20R capable of not only transmitting the driving force, transmitted from the driving portion 5 to the feeding screw 43, to the second collecting signal 45R but also interrupting transmission of the driving force. Further, when the feeding screw 43 is rotationally driven in the first direction by the driving portion 5, the first drive transmitting portion 20L transmits the driving force from the feeding screw 43 to the first collecting screw 45L, and the second drive transmitting portion 20R transmits the driving force from the feeding screw 43 to the second collecting screw 45R. Further, when the feeding screw 43 is rotationally driven in the second direction, the first drive transmitting portion 20L interrupts transmission of the driving force from the feeding screw 43 to the first collecting screw 45L, and the second drive transmitting portion 20R transmits the driving force from the feeding screw 43 to the second collecting screw 45R.

Incidentally, a basic operation sequence of the developer collecting device 1 in this embodiment can be made similar to the operation sequence described in the embodiment 1 with reference to FIG. 12. Further, the operation sequence including the switching operation of the collected developer feeding direction due to the dismounting of the first and second developer collecting containers 10L and 10R in this embodiment can be made similar to the operation sequence described in the embodiment 1 with reference to FIGS. 13 and 14. However, in this embodiment, there is no control of the operations of the first and second collecting driving portions 6L and 6R in interrelation with the control of the operation of the feeding screw 43 by the driving portion 5.

As described above, according to this embodiment, not only an effect similar to the effect of the embodiment 1 can be obtained, but also simplification of the constitution of the developer collecting device 1 can be realized in this embodiment more than in the embodiment 1.

OTHER EMBODIMENTS

The present invention was described based on the specific embodiments mentioned above, but is not limited to the above-mentioned embodiments.

In the above-described embodiments, the image forming apparatus was the tandem type color image forming apparatus employing the intermediary transfer type, but the present invention is not limited thereto. For example, the image forming apparatus may also be a tandem type color image forming apparatus employing a direct transfer type. This image forming apparatus includes, as is well known by the persons skilled in the art, a recording material carrying member (feeding belt or the like constituted by an endless belt) for carrying and feeding the recording material, in place of the intermediary transfer member in the above-described embodiments. Further, toner images formed on the image bearing members of the plurality of stations are successively transferred onto the recording material carried and fed by the recording material carrying member, and after the transfer, the recording material is discharged to the outside of the image forming apparatus. In this image forming apparatus, an image forming portion includes the respective stations, the recording material carrying member and the fixing device. Further, the image forming apparatus may also be a so-called one drum-type color image forming apparatus in which each of the toner images of a plurality of colors is successively transferred onto a single image bearing member and then is transferred onto the intermediary transfer member or the recording material carrying member. In this image forming apparatus, an image forming portion includes a toner image forming portion (corresponding to the station) for forming the toner images on the single image bearing member, the intermediary transfer member (or the recording material carrying member) and the fixing device. Further, the image forming apparatus may also be a monochromatic image forming apparatus. In this case, an image forming portion includes a toner image forming portion (corresponding to the station) for forming the toner image on a single image bearing member and the fixing device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2020-073186 filed on Apr. 15, 2020 and 2021-044184 filed on Mar. 17, 2021, which are hereby incorporated by reference herein in their entirety.

What is claimed is:

1. An image forming apparatus comprising:

an image forming portion configured to form a toner image;

a main assembly in which said image forming portion is provided;

a first collecting container provided in said main assembly and detachably mountable to a first mounting portion and configured to collect residual toner discharged from said image forming portion;

a second collecting container provided in said main assembly and detachably mountable to a second mounting portion and configured to collect the residual toner discharged from said image forming portion;

a feeding device provided in said main assembly and configured to feed the toner, discharged from said image forming portion, to said first collecting container and said second collecting container;

a controller provided in said main assembly and configured to control said feeding device, wherein in a case that said first collecting container becomes full when said feeding device feeds the toner to said first collecting container during image formation, said controller is constituted so as to control said feeding device so that a feeding destination of the toner is switched from said first collecting container to said second collecting container and is constituted so as to control said image forming portion so that an image forming operation is continued;

a first discrimination mark provided for a user to indicate a position of the collecting container to be replaced and provided at a position corresponding to said first mounting portion;

a second discrimination mark provided for the user to indicate a position of the collecting container to be replaced and provided at a position corresponding to said second mounting portion;

a display portion provided in said main assembly and configured to display information on a position of said collecting container to be exchanged by the user; and a cover member openable to an open position where the first discrimination mark and the second discrimination mark are exposed and closable to a closed position where the first discrimination mark and the second discrimination mark are not exposed, wherein the controller is configured to display the position of said collecting container to be exchanged by using said first discrimination mark or said second discrimination mark in a closed position of said cover member in a case that either one of said first collecting container and said second collecting container is to be exchanged.

2. An image forming apparatus according to claim 1, further comprising a common door configured to open and close said first mounting portion and said second mounting portion, wherein said first discrimination information and said second discrimination information are provided on an inside surface of said common door.

3. An image forming apparatus according to claim 2, wherein said common door is rotatable about a rotational axis extending along a widthwise direction crossing an up down direction at a lower portion thereof.

4. An image forming apparatus according to claim 3, wherein said common door is provided at a lower portion of the image forming apparatus body.

5. An image forming apparatus according to claim 1, wherein said first discrimination information and said second discrimination information are characters.

6. An image forming apparatus according to claim 1, wherein said first discrimination information and said second discrimination information are numbers to indicate the position of the container to be replaced.

7. An image forming apparatus according to claim 1, wherein said first collecting container is detachably mountable to said second mounting portion and said second collecting container is detachably mountable to said first mounting portion.

8. An image forming apparatus according to claim 1, wherein said first discrimination information and said second discrimination information are provided on the side wall where said first mounting portion and said second mounting portion are provided.

* * * * *